US008633983B2

United States Patent
Kludas et al.

(10) Patent No.: US 8,633,983 B2
(45) Date of Patent: Jan. 21, 2014

(54) FEATURE DETECTION APPARATUS AND METHOD FOR MEASURING OBJECT DISTANCES

(75) Inventors: Torsten Kludas, Zottelstedt (DE); Nick Mein, Christchurch (NZ); Brendon Swann, Christchurch (NZ)

(73) Assignee: Trimble Jena GmbH, Jena (DE)

( * ) Notice: Subject to any disclaimer, the term of this patent is extended or adjusted under 35 U.S.C. 154(b) by 479 days.

(21) Appl. No.: 12/648,097

(22) Filed: Dec. 28, 2009

(65) Prior Publication Data
US 2010/0165101 A1 Jul. 1, 2010

Related U.S. Application Data

(63) Continuation of application No. PCT/EP2007/056633, filed on Jul. 2, 2007.

(51) Int. Cl.
*H04N 7/18* (2006.01)
(52) U.S. Cl.
USPC ........................................... 348/135; 348/136
(58) Field of Classification Search
USPC .......................... 348/125, 135, 136; 382/321
See application file for complete search history.

(56) References Cited

U.S. PATENT DOCUMENTS

| | | | |
|---|---|---|---|
| 5,642,285 A | 6/1997 | Woo et al. | |
| 6,064,759 A | 5/2000 | Buckley et al. | |
| 6,147,598 A | 11/2000 | Murphy et al. | |
| 6,282,362 B1 | 8/2001 | Murphy et al. | |
| 6,330,523 B1 * | 12/2001 | Kacyra et al. | 702/159 |
| 6,614,452 B1 | 9/2003 | Cable | |
| 7,339,611 B2 | 3/2008 | Marold et al. | |
| 7,541,974 B2 | 6/2009 | Scherzinger | |

(Continued)

FOREIGN PATENT DOCUMENTS

DE 19922321 C2 7/2002
EP 1 610 092 A1 12/2005

(Continued)

OTHER PUBLICATIONS

Ahn et al. "Circular coded target for automation of optical 3D-measurement and camera calibration," International Journal of Pattern Recognition and Artificial Intelligence (IJPRAI), vol. 15, No. 6, Sep. 2001, pp. 905-919.

(Continued)

*Primary Examiner* — Mehrdad Dastouri
*Assistant Examiner* — Kristin Dobbs
(74) *Attorney, Agent, or Firm* — Kilpatrick Townsend & Stockton LLP

(57) ABSTRACT

A feature detection apparatus and method for obtaining in a defined area of interest a parametric shape based on a selected combination of parameter values, constituting an approximation to an object feature. The feature detection apparatus includes an input unit for receiving at least two area indicator lines for defining in a digital image an area of interest, a parameter range defining unit for defining ranges of at least two parameters of a parametric shape, for which the parametric shape intersects at least one of the area indicator lines; a parameter selection unit for selecting a combination of parameter values from the parameter ranges, for which the parametric shape constitutes an approximation to an object feature of the object in the area of interest; and an output unit for providing the parametric shape based on said combination of parameter values for a display in the digital image.

29 Claims, 12 Drawing Sheets

(56) References Cited

U.S. PATENT DOCUMENTS

| | | |
|---|---|---|
| 7,619,561 B2 | 11/2009 | Scherzinger |
| 7,697,127 B2 | 4/2010 | Vogel et al. |
| 7,719,467 B2 | 5/2010 | Norda et al. |
| 2005/0125142 A1 | 6/2005 | Yamane |
| 2006/0078189 A1 | 4/2006 | Hosoya et al. |
| 2009/0138233 A1 | 5/2009 | Kludas et al. |
| 2009/0220144 A1 | 9/2009 | Mein et al. |
| 2009/0262974 A1 | 10/2009 | Lithopoulos |
| 2010/0141759 A1 | 6/2010 | Scherzinger |
| 2010/0172546 A1 | 7/2010 | Sharp |
| 2010/0174507 A1 | 7/2010 | Vogel et al. |

FOREIGN PATENT DOCUMENTS

| | | |
|---|---|---|
| EP | 1936323 A2 | 6/2008 |
| EP | 1944572 A1 | 7/2008 |
| FR | 2827399 A | 1/2003 |
| WO | WO 01/37195 A1 | 5/2001 |
| WO | WO 2007/031248 A2 | 3/2007 |
| WO | WO 2009/100773 A1 | 8/2009 |
| WO | WO 2009/100774 A1 | 8/2009 |
| WO | WO 2009/103342 A1 | 8/2009 |
| WO | WO 2009/106141 A1 | 9/2009 |
| WO | WO 2010/080950 A1 | 7/2010 |

OTHER PUBLICATIONS

Pedersini et al., "Improving the performance of edge localization techniques through error compensation" Signal Processing: Image Communication, vol. 12, No. 1, Mar. 1998, pp. 33-47.

International Preliminary Report on Patentability of PCT Application No. PCT/EP2007/004593, mailed Jan. 14, 2010, 10 pages total.

* cited by examiner

FEATURE DETECTION APPARATUS AND METHOD FOR MEASURING OBJECT DISTANCES

CROSS-REFERENCES TO RELATED APPLICATIONS

The application claims priority to and is a continuation of International Patent Application No. PCT/EP2007/056633, filed on Jul. 2, 2007, the disclosure of which is hereby incorporated by reference in its entirety for all purposes.

BACKGROUND OF THE INVENTION

The present invention relates to a feature detection apparatus and method for measuring structures of an object, and in particular, to a feature detection apparatus and method for measuring structures, such as diffuse reflective structures.

Optical instruments, such as surveying instruments are commonly used for distance measurement and comprise a complex arrangement of optical and electronic elements.

In recent years, imaging devices have been integrated in surveying instruments providing digital video data of an object in addition to distance measurement information. The imaging and distance measurement information may include horizontal and vertical angles, a distance to the object and an image of the object revealing its structures. This information may then be used to create a three-dimensional representation of the object.

However, due to the advancement of technology, a vast amount of data can be obtained through imaging and distance measurements, which has to be processed and analyzed correctly.

Several ways have been proposed to acquire an image with an optical instrument and at the same time measure the distance to each pixel in the image, for example, by sequentially scanning and measuring each position corresponding to a point in a three-dimensional grid.

For example, optical surveying instruments with imaging, direction and distance measuring capabilities with a fast rotating polygon mirror for laser beam deflection have been proposed, wherein a laser beam is scanned over an object, while a distance to a position on the object is measured and the horizontal and vertical angles to the position on the object with respect to the mirror position of the instrument are recorded.

Alternatively, an image may be recorded with a camera in advance and positions corresponding to the pixels in the image may then be derived and measured separately by a distance measuring device.

In each of the above-discussed optical instruments a large amount of distance and angle information is obtained, wherein often the largest part of the data is of no real interest to the user, since it may not relate to the desired object or specific object feature to be analyzed. This part of information reduces the speed of the measurement and requires large processing power so that often real-time data processing is not possible.

This means that the user might have to transfer the recorded data to a separate computer and select the data of interest after data acquisition.

On the other hand, specifying the data to be acquired in advance before data acquisition by the user may be time consuming and complicated, especially under field conditions, such as snow, rain and wind, where a fast automatic acquisition is preferable.

SUMMARY OF THE INVENTION

Therefore, the need arises for a feature detection apparatus and method minimizing user intervention and operation time and enabling simple and quick data processing and acquisition.

According to an embodiment, a feature detection apparatus comprises an input unit for receiving at least two area indicator lines for defining in a digital image an area of interest comprising parts of an object; a parameter range defining unit for defining ranges of at least two parameters of a parametric shape to be introduced into the digital image, for which the parametric shape intersects at least one of the area indicator lines; a parameter selection unit for selecting a combination of parameter values from the parameter ranges, for which the parametric shape constitutes an approximation to an object feature of the object in the area of interest; and an output unit for providing the parametric shape based on said combination of parameter values for a display in the digital image. Accordingly, approximations to object features may quickly be obtained by using parametric shapes as approximations in a limited area, wherein a simplified selection of possible combinations of parameter values for parametric shapes is achieved by setting simple boundary conditions reducing the input and processing time.

According to an advantageous example, the input unit is adapted to receive information identifying the parametric shape, wherein the parametric shape constitutes one of a plurality of pre-selectable candidate parametric shapes. Accordingly, processing time may further be reduced, since possible parametric shapes as approximations to an object feature are limited.

According to another advantageous example, the parameter range defining unit is adapted to define ranges of parameters of a plurality of different parametric shapes, for which each of the parametric shapes intersects at least one of the area indicator lines. Accordingly, the parameter range defining unit may select from different ranges of parameters of different parametric shapes so that the quality of the approximation to an object feature may be increased.

According to another advantageous example, the parameter selection unit is adapted to select the combination of parameter values such that the parametric shape constitutes a best fit approximation to the object feature of the object in the area of interest. Accordingly, approximations to the object features may be obtained constituting the best possible combination of parameter values of a specific parametric shape so that the object feature may be described in simple mathematical terms without deviating from the actual feature.

According to another advantageous example, the parameter range defining unit is adapted to define sub-ranges of the at least two parameters of at least one parametric shape, for which the at least one parametric shape intersects at least two area indicator lines. Accordingly, the boundary conditions for the selection of different parameter values of a specific parametric shape are changed so that the number of possible combinations of parameter values decreases and similarly, also the processing time.

According to another advantageous example, the input unit is adapted to receive at least two indicator points to define the end points of an indicator line. Accordingly, an area indicator line may simply be defined by two points simplifying the input of such a boundary condition.

According to another advantageous example, the at least two area indicator lines are based on two indicator points, wherein the area indicator lines extend through the indicator points so that the area indicator lines define an essentially rectangular area of interest. Accordingly, it is possible to define an area of interest quickly by merely using two indicator points so that it is not necessary to input complete lines or a complete two-dimensional outline to define an area of interest in the digital image.

According to another advantageous example, the feature detection apparatus further comprises a detection unit for obtaining object feature pixels of the object feature in the area of interest by processing the area of interest using a detection algorithm or by an operator for selecting the object feature pixels in the area of interest. Accordingly, pixels corresponding to the positions of the object feature may be obtained automatically and/or quickly.

According to another advantageous example, the feature detection apparatus further comprises a calculation unit for calculating the approximation to said object feature based on the obtained object feature pixels of the object feature. Accordingly, the approximation may be calculated directly in the feature detection apparatus increasing the speed of the calculation.

According to another advantageous example, the feature detection apparatus further comprises a filter unit for filtering out from said obtained object feature pixels exceeding a specific distance to said parametric shape based on the selected combination of parameter values, and a recalculation unit for recalculating the approximation to said object feature based on the obtained object feature pixels not including the object feature pixels exceeding the specific distance. Accordingly, a more accurate approximation to the object feature may be achieved by determining outlier pixels and recalculating the approximation without these outlier pixels.

According to another advantageous example, the parametric shape based on said selected parameter values is superimposed on the object feature in the digital image on a display unit. Accordingly, it is possible for an operator to quickly verify the quality of the approximation and the performance of the system, and to intervene, if necessary.

According to another advantageous example, the parameter selection unit is adapted to select another combination of parameter values from the parameter ranges, for which a second parametric shape constitutes an approximation to a second object feature in the area of interest, and wherein a central line between the two parametric shapes is calculated. Accordingly, not only the outline of an object in a two-dimensional representation may be detected, but also it is possible to determine the center of an object.

According to another embodiment, an optical instrument is provided, comprising the above-discussed feature detection apparatus. Accordingly, the feature detection apparatus may be integrated in an optical instrument for improved data processing.

According to another advantageous example, the optical instrument further comprises a first control element for defining on the parametric shape a measurement pixel and converting the measurement pixel into an approximation of coordinates of a position of the object to be measured assuming a default distance between the position and the optical instrument. Accordingly, the distance of a position of the object may be measured with the knowledge of the coordinates of the position.

According to another advantageous example, the optical instrument further comprises a lens arrangement for sighting the object, a positioning unit for adjusting the optical axis of the lens arrangement relative to at least one reference axis and a second control element adapted to instruct the positioning unit to adjust the optical axis of the lens arrangement onto the position to be measured. Accordingly, the approximation of coordinates of a position of the object may be used to adjust the optical axis of the lens arrangement onto the position to be measured.

According to another advantageous example, the optical instrument farther comprises a distance measuring unit for measuring a distance to the object along a measurement axis of the distance measuring unit, parallel to the optical axis of the lens arrangement, wherein the second control element is adapted to instruct the distance measuring unit to measure the distance to the position to be measured, and the first control element is further adapted to recalculate the coordinates of the position based on the measured distance. Accordingly, the coordinates of the positions may be obtained with high accuracy, since the coordinates are obtained iteratively, eliminating measurement errors due to possible alignment offsets in the optical instrument.

According to another advantageous example, the optical instrument further comprises a camera aligned with the optical axis of the lens arrangement for acquiring the image of the area of interest comprising parts of the object. Accordingly, the image of the area of interest and its positional relation with respect to the optical instrument is obtained with high accuracy.

According to another embodiment, a method comprises receiving at least two area indicator lines for defining in a digital image an area of interest comprising parts of an object; defining ranges of at least two parameters of a parametric shape to be introduced into the digital image, for which the parametric shape intersects at least one of the area indicator lines; selecting a combination of parameter values from the parameter ranges, for which the parametric shape constitutes an approximation to an object feature of the object in the area of interest; and providing the parametric shape based on said combination of parameter values for display in the digital image. Accordingly, approximations to object features may quickly be obtained by using parametric shapes as approximations in a limited area, wherein a simplified selection of possible combinations of parameter values for parametric shapes is achieved by setting simple boundary conditions reducing the input and processing time.

According to another embodiment, a non-transitory program may be provided including instructions adapted to cause data processing means to carry out a method with the above features.

According to another embodiment, a non-transitory computer readable medium may be provided, in which a program is embodied, where the program is to make a computer execute the method with the above features.

According to another embodiment, a non-transitory computer program product may be provided, comprising the computer readable medium.

Further advantageous features of the invention are disclosed in the claims.

DETAILED DESCRIPTION OF THE INVENTION

Preferred embodiments of the invention are described with reference to the figures. It is noted that the following description contains examples only and should not be construed as limiting the invention.

Embodiments of the invention generally relate to obtaining a parametric shape based on a combination of parameter values as an approximation to an object feature, and particularly, to improve the quality of such an approximation and the speed needed for obtaining such an approximation by intelligently combining user operation input and automatic image processing.

Briefly said, an area of interest comprising parts of an object can be defined by at least two simple strokes, e.g. on a touch screen, constituting area indicator lines, wherein a parametric shape is fitted to an object feature of the object in the area of interest with the boundary condition that the parametric shape intersects at least one of the two strokes. The parametric shape may be defined by two parameters or more having different ranges all fulfilling the boundary condition. From these ranges, however, only one or a few combinations of parameter values lead to a good approximation of the parametric shape to the object feature. Finally, several positions of excellent points on the object feature may then be measured by an optical surveying instrument.

Figure 1:
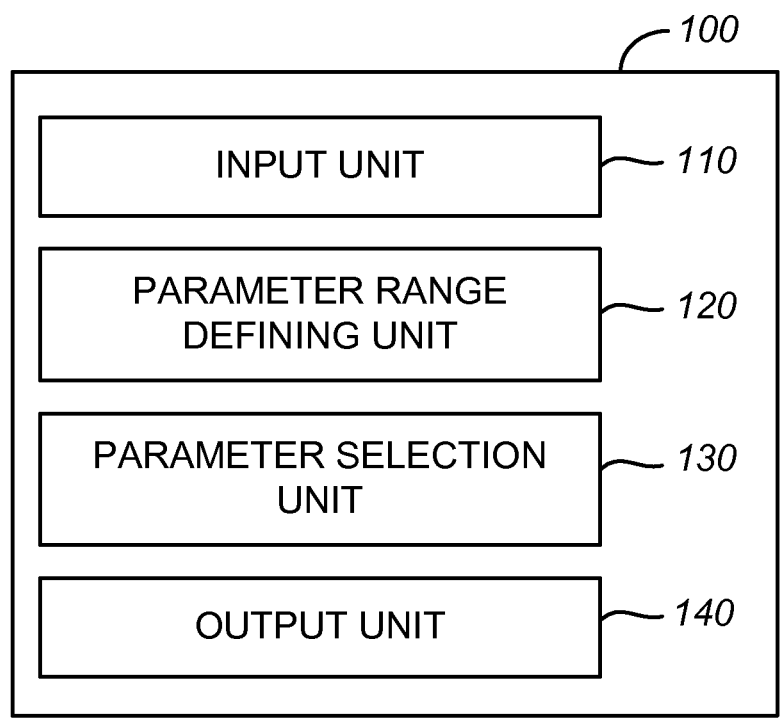
FIG. 1 illustrates a feature detection apparatus according to an embodiment of the invention.

FIG. 1 illustrates elements of a feature detection apparatus 100 according to an embodiment of the invention, comprising an input unit 110, a parameter range defining unit 120, a parameter selection unit 130, and an output unit 140.

These units may constitute all individual units being connected with each other, or may be integrated in one unit. The units or the integrated unit may be realized by a hardware arrangement, such as hard-wired circuits or ASICs (application specific integrated circuits) or software or any suitable combination of the above. The functions performed by the input unit 110, the parameter range defining unit 120, the parameter selection unit 130 and the output unit 140 will be described in detail below.

The input unit 110 is adapted to receive area indicator lines for defining in a digital image the area of interest comprising parts of an object. This means that the input unit 110 constitutes an interface for receiving information from a user or another device. It is feasible that information about the position of area indicator lines is received through a wireless link so that the input unit 110 receives information about area indicator lines through the air interface, wherein the area indicator lines have been inputted on a different device and then transmitted by a transmitter to the input unit. Further, instead of wireless transmission, also a fixed line connection may be used.

In a simple example, where a digital image is shown on a screen, such as an LCD screen, the input unit 110 may constitute a touch screen, on which the area indicator lines may be marked with a pen stylus. However, as indicated above, such a touch screen also may be provided at a remote location so that the input unit 110 of the feature detection apparatus 100 is only a kind of interface receiving the information inputted in the touch screen through wireless technology or fixed line connections.

The parameter range defining unit 120 is provided for defining ranges of at least two parameters of the parametric shape to be introduced into the digital image, for which the parametric shape intersects at least one of the area indicator lines. As discussed above, the digital image comprises parts of the object and is taken, for example, by a camera, such as a CCD camera, which converts light into electrical signals.

For example, the parametric shape may be a straight line defined by two parameters, such as ax+b. Under the boundary condition that the parametric shape has to intersect at least one of the area indicator lines, ranges of parameter a and parameter b may be obtained so that different values of a and b satisfy this condition.

The parametric shape is preferably not limited to a linear straight line, but may also be constituted by other functions, such as a parabola, hyperbola, ellipse, etc. Therefore, the parameter range defining unit may also be adapted to define ranges of parameters of a plurality of different shapes, for which each of the parametric shapes intersects at least one of the area indicator lines.

The parameter selection unit 130 is provided for selecting a combination of parameter values from the above-discussed parameter ranges, for which the parametric shape constitutes an approximation to an object feature of the object in the area of interest. In other words, the parameter selection unit 130 fits parametric shapes of the same type but different combinations of parameter values to the object feature until a good approximation to the object feature is obtained.

For example, the parameter selection unit 130 may have information about an object feature of the object, as well as information about the parameter ranges of one or a plurality of parametric shapes, wherein the latter is obtained from the parameter range defining unit 120. Then, the parameter selection unit selects a combination of parameter values such that the parametric shape based on these parameter values constitutes a good approximation to the object feature by comparing deviations between each one of several parametric shapes based on specific combinations of parameter values with the object feature and selecting the parameter shape so that the deviation is small.

Preferably, the parameter selection unit 130 selects the combination of parameter values such that the parametric shape constitutes a best fit approximation to the object feature. For example, as described above, the deviation between the object feature and the parametric shape in the area of interest is calculated and the parameter values and different parameter shapes are varied such that the deviation is minimized. However, it should be noted that also parametric shapes constituting just a fairly good approximation to an object feature may be sufficient for several applications, especially since such combinations of parameter values may be obtained quicker and may approximate the rough shape of the object feature without mapping it in detail.

The output unit 140 provides the parametric shape based on the combination of parameter values received above for display in the digital image. In other words, similarly to the input unit forming the input interface, the output unit forms the output interface. That means that the parametric shape does not have to be displayed at the feature detection apparatus 100 but may be provided to another unit such as a display unit which may be located at a remote location.

Here again, the information on the parametric shape and its position relative to the object feature in the area of interest may be communicated wirelessly or by a fixed line connection. As discussed above, in a very simple example, the output unit 140 may be part of the display unit and the parametric shape based on the selected parameter values may be superimposed on the object feature in the digital image on the display unit. However, displaying is not essential, since the data may also be stored in a memory for further processing or viewing at a later time.

During operation of the arrangement shown in FIG. 1, the input unit 110 receives two area indicator lines so that the parameter range defining unit 120 can define ranges of at least two parameters of the parametric shape intersecting at least one of the lines.

Once the area indicator lines and the possible ranges of parameters of the parametric shape are known, the parameter selection unit 130 may then select a combination of parameter values, for which the parametric shape constitutes preferably a good approximation to an object feature, wherein the parametric shape based on this combination may be further provided to be displayed or stored.

Therefore, as discussed above, an efficient combination of user operation and automatic image processing is obtained for defining in a digital image a small area of interest, in which an object feature is detected more easily so that parameter values, for which a parametric shape constitutes an approximation, may be obtained quickly without a long input and processing time.

In the following, operations of the feature detection apparatus will be described with regard to FIG. 2.

Figure 2:
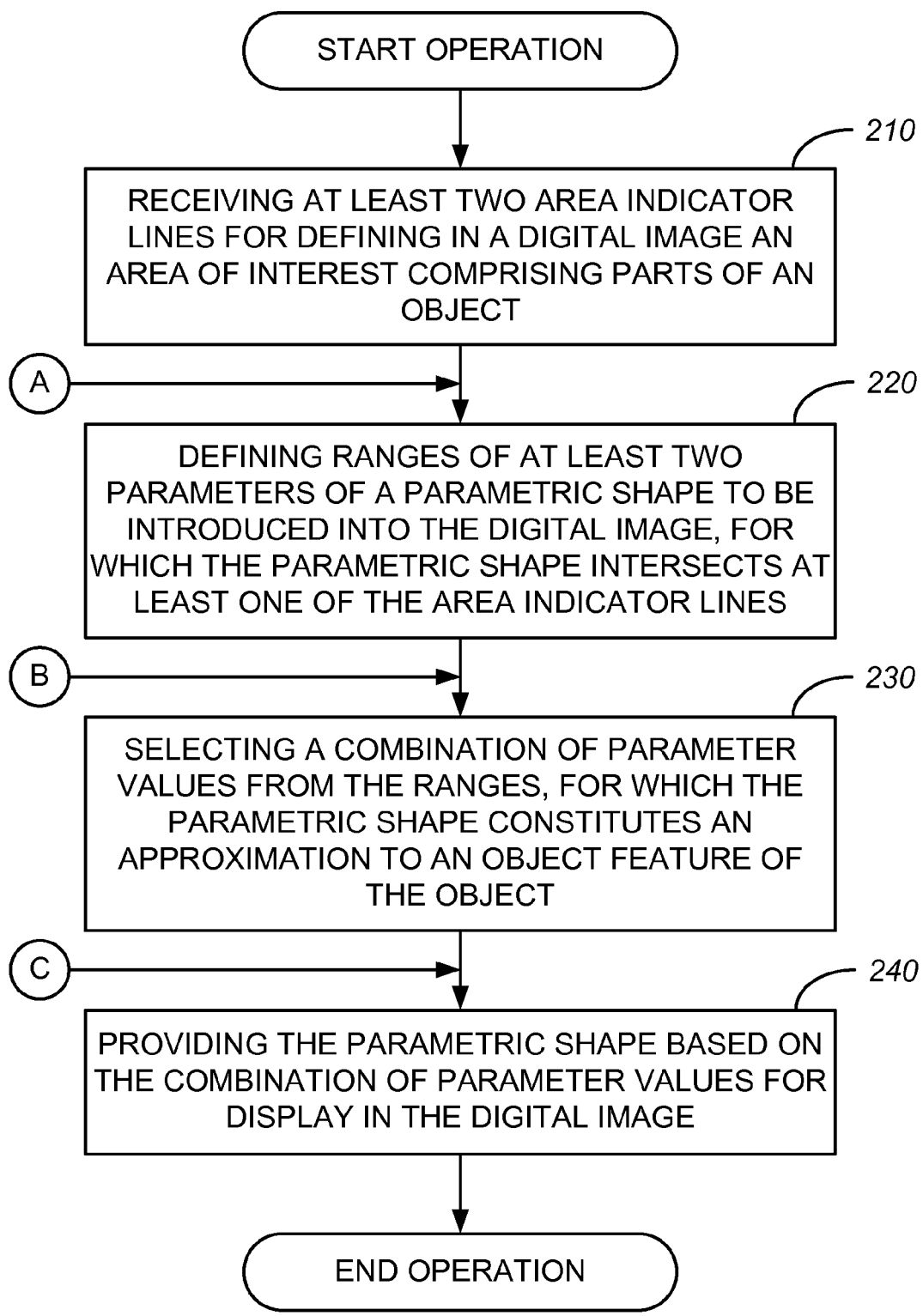
FIG. 2 illustrates operations for obtaining a parametric shape based on a combination of parameter values, constituting an approximation to an object feature, and is a method according to an embodiment of the invention.

FIG. 2 illustrates a flow diagram of operations of a feature detection method for obtaining a parametric shape based on a combination of parameter values constituting an approximation to an object feature, such as during operation of the feature detection apparatus 100 shown in FIG. 1.

In a first operation 210, when starting operations, at least two area indicator lines are received for defining in a digital image an area of interest comprising parts of an object. As discussed above, the area indicator lines may be received in different ways, for example directly inputted in the input unit 110 or received electronically or optically as a data stream.

In a subsequent operation 220, ranges of at least two parameters of a parametric shape to be introduced in the digital image are defined, for which the parametric shape intersects at least one of the area indicator lines. This operation may automatically start after information about the area indicator lines is obtained. Preferably, parameter ranges of a plurality of parametric shapes are defined. However, it is also possible to pre-select one or several parametric shapes in advance to limit the number of parametric shapes and their corresponding parameter ranges reducing the time needed for defining the ranges by a parameter range defining unit. This will be described in more detail further below.

In an operation 230, after receiving at least two area indicator lines and defining parameter ranges according to operations 210 and 220, a combination of parameter values is selected from the ranges, for which the parametric shape constitutes an approximation to an object feature of the object.

For example, if the object feature in the area of interest is a straight line, the parametric shape of a straight line, namely ax+b is selected with parameter values for a and b such that the parametric shape and the object feature basically lie on top of each other, i.e. correspond to similar pixels in a digital image.

It is once again noted that a digital image itself does not necessarily have to be displayed and viewed by a user, since the present invention is also applicable to the underlying electronic data of the digital image and corresponding electronic data of the parametric shape. Possibilities for obtaining an object feature from electronic data acquired by an imaging device will be discussed later.

As discussed above, preferably, the combination of parameter values is selected so that the parametric shape constitutes a best fit approximation to the object feature of the object. To achieve this, known fitting algorithms may be used, such as least square fitting.

Finally, in an operation 240, the parametric shape based on the combination of parameter values is provided for display in, e.g. a digital image of a display unit. Providing the parametric shape may mean outputting the parametric shape data to a storage or remote display unit, directly to a display unit, to a processor, in which it is further processed, or to a wireless or fixed line network so that the data can be used by other devices.

In the following, with regard to FIGS. 3A and 3B, examples of the previously described operations are described in more detail.

Figure 3A:
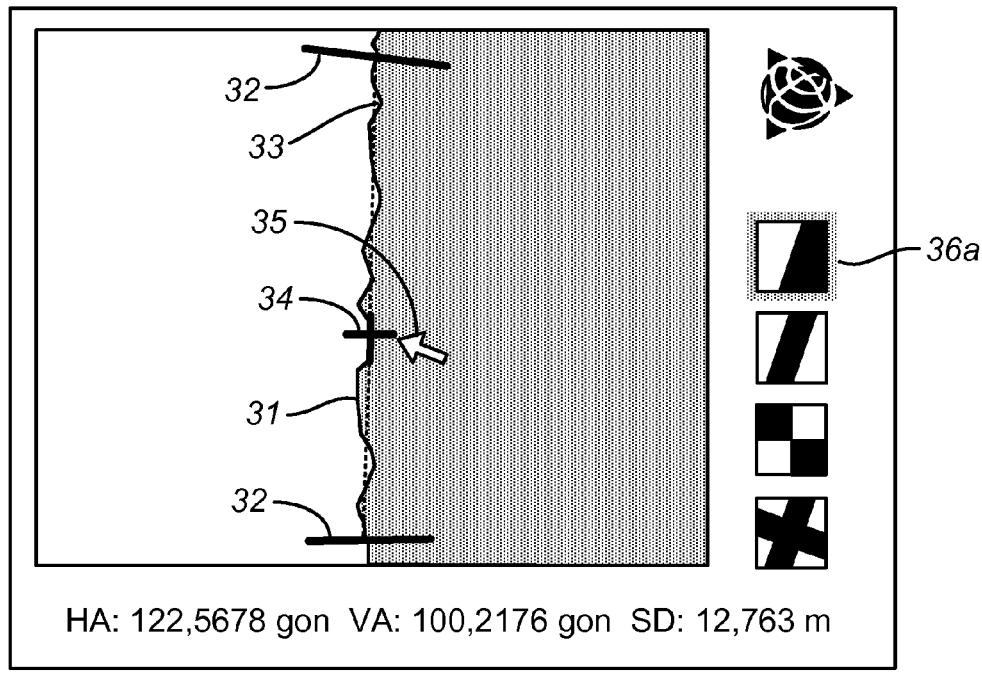
FIG. 3A illustrates an image of a linear object and a parametric shape constituting an approximation to an object feature of the linear object.

FIG. 3A shows an example of a screen showing the operation and control of the feature detection apparatus 100. A part of an object is shown in grey in a digital image on the screen, wherein the corresponding object feature 31 is shown as a jagged line in the middle of the digital image. Area indicator lines 32 are shown substantially orthogonal to the jagged line 31, crossing the jagged line at the top and at the bottom of the shown image. An approximation of the jagged line 31 is shown by the dashed approximation line 33 interpolating the edge of the object, namely the object feature of the object shown in the image. The object, such as a wall, building, tree, street, etc. is often a non-reflective or diffuse structure.

Figure 3B:
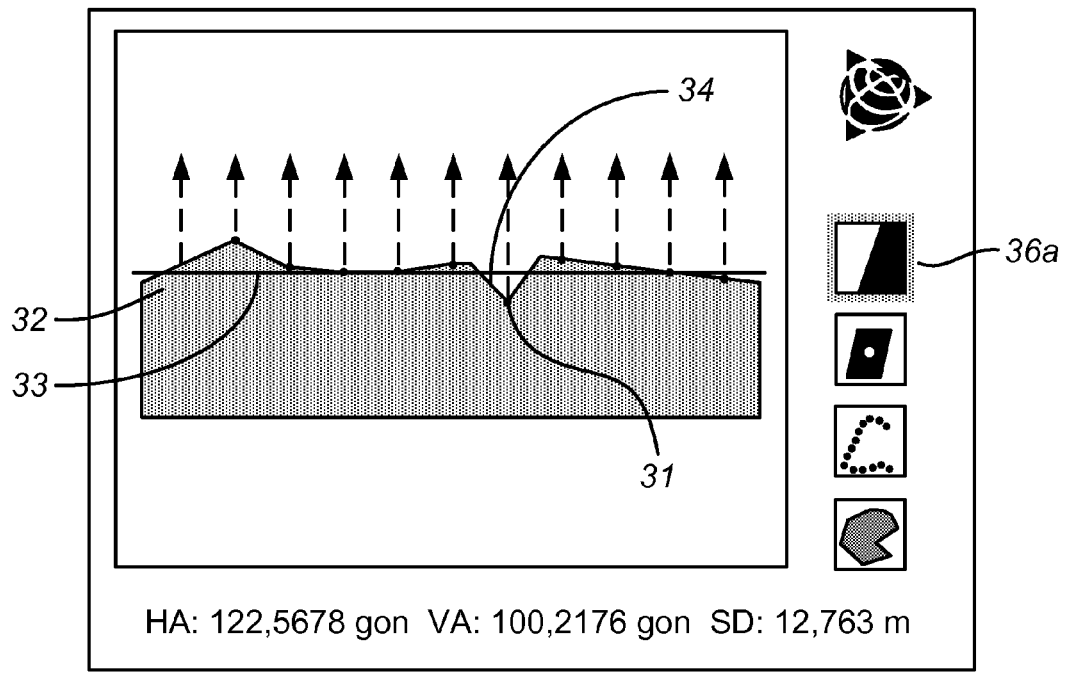
FIG. 3B illustrates the principles for detecting an object feature.

FIG. 3B describes the principle of the process to obtain the dashed approximation line 33 of FIG. 3A. The area indicator lines 32 of FIGS. 3A and 3B, which may have been drawn by a pen stylus on a touch screen or obtained by any other method discussed above, cover the area of interest, in which an object feature, e.g. a jagged edge of an object, is present.

In detail, FIG. 3B shows several rays defined to detect a certain number of pixels at the object edge constituting object feature pixels. Such detection may be performed by a detection algorithm carrying out edge detection in the area of interest, for example, by analyzing the grey values in the image along a ray. Thereby, several object feature pixels may be obtained automatically.

In other words, the parametric shape or parts of it, should be located roughly within the area of interest defined by the indicator lines. Further, the parametric shape is roughly orthogonal to rays drawn parallel to the indicator lines.

It should be noted that instead of using a detection algorithm, object feature pixels may also be indicated or defined by a user directly on a display unit.

Once several object feature pixels on the jagged edge of the object are defined, these pixels may be used to calculate an approximation to the object feature, based on known fitting algorithms.

In this example, a straight approximation line 33 is fit to the object feature pixels as a linear approximation to the object feature of the object. In detail, the approximation line 33 is based on a parametric shape, namely a straight line given by the mathematical expression f(x)=ax+b. On top of the approximation line, a measurement cursor 34 can be moved with an operation cursor 35 by, e.g., a computer mouse, joystick, track ball, pen stylus in a touch screen environment, or similar, or the measurement cursor may be moved directly on the approximation line with one of the mentioned devices without an operation cursor. The above-mentioned devices may also be used to indicate the area indicator lines on the digital image.

On the right side of FIGS. 3A and 3B buttons are shown constituting a menu for defining a fitting operation type. For example, button 36a, when pushed or otherwise activated, indicates that one straight line should be used for fitting. Therefore, information identifying the parametric shape to be used for obtaining the approximation line can be obtained, wherein the parametric shape constitutes one of a plurality of pre-selectable candidate parametric shapes. Hence, the buttons may be regarded as part of an input unit.

The measurement cursor 34 may be moved up and down on the approximation line 33, as described above, and thus may indicate a position, for which a measurement should be obtained.

The position of the measurement cursor 34 corresponds to a measurement pixel in the image. For surveying instruments with imaging capability, methods have been described to convert the position of a pixel in the image to the corresponding coordinates of position on the real object indicated by horizontal and vertical angles.

For example, horizontal and vertical angles HA, VA, on the bottom of FIGS. 3A and 3B are the coordinates of the position on the object corresponding to the pixel in the center of the digital image. That is, the coordinates indicate the direction, in which the shown image is recorded by a camera with respect to a coordinate system of the camera setup or optical instrument.

Once the position on the object is known, a distance measuring unit of a surveying instrument may be used to obtain the distance to this position, here indicated by SD. Such a measurement process will be described further below.

Subsequently, other selected positions can be measured on the approximation line by means of image processing and converting the pixels in the image to corresponding positions on the object and finally measuring the respective distances. These positions may be regarded as excellent points of the object, since already some of these positions of the object may be sufficient to define the object feature 31 and describe the structure of the object.

Since, in the method discussed above, only a certain number of object feature pixels has to be obtained and outliers may be disregarded or averaged out, as will be discussed below, reliable detection of an object feature, such as a specific structure of the object, may be obtained. Obtaining a very large amount of object feature pixels corresponding to the object feature is time consuming and error prone, especially for non-reflective or diffuse structures, for which the object feature is hard to detect by analyzing a grey scale change in the image. By basically providing a guess of how the object feature should look like, for example in FIGS. 3A and 3B a straight line 33, a good approximation of the jagged edge of the object constituting the object feature in this case, may be obtained.

Figure 4A:
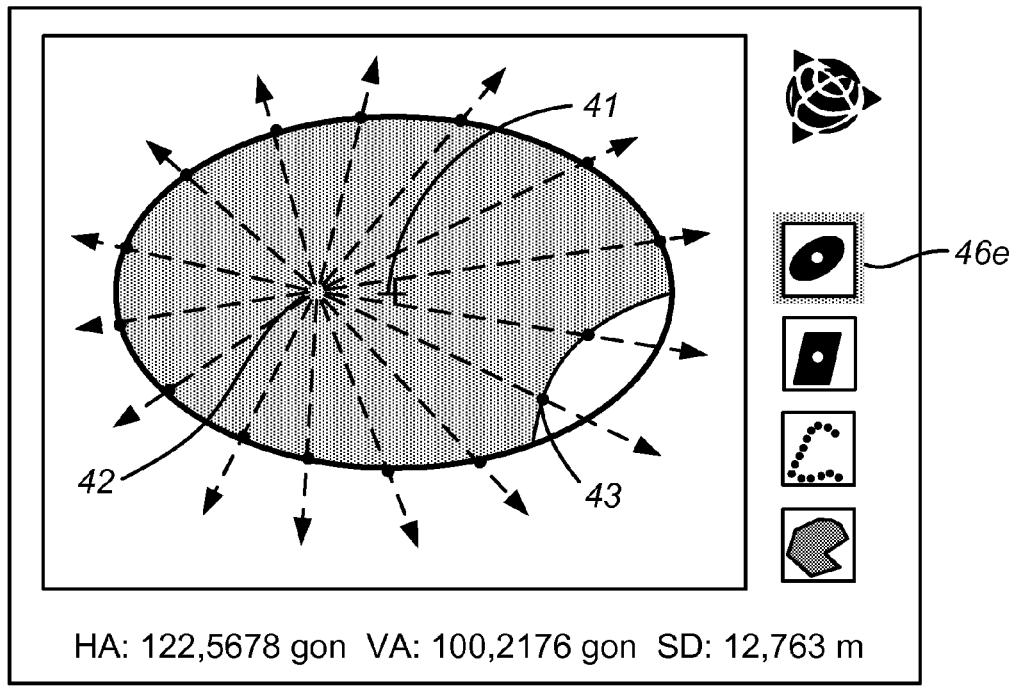
FIG. 4A illustrates the known principles for detecting an ideal undisturbed ellipse.
Figure 4B:
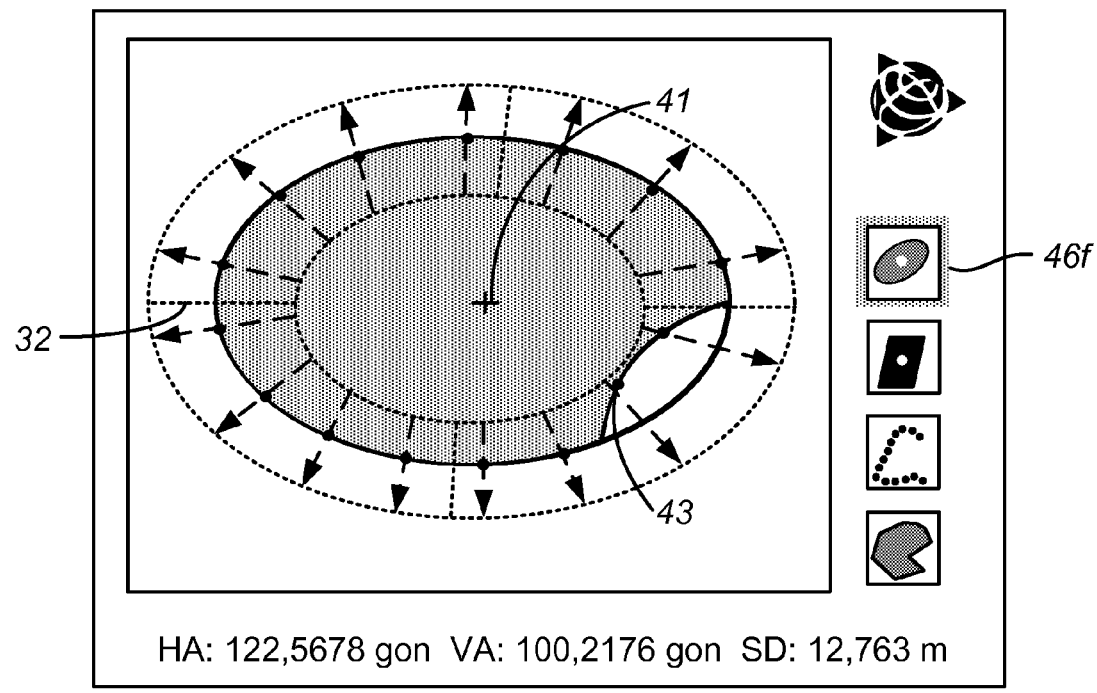
FIG. 4B illustrates the principles for detecting a disturbed ellipse according to the invention.

FIGS. 4A and 4B explain the application of the feature detection method of an embodiment of the invention with respect to a non-linear or elliptic shape.

FIG. 4A describes the principle to measure a center point 41 of an ideal or undistorted circular object, which, when recorded by an imaging device, may actually appear elliptical. The shown principal is known from the literature and is used to measure retro-reflective targets in industrial applications, for example. Here, an example is shown in which the user selects a parametric shape with the button 46e, and marks a point 42 roughly in the center of the ellipse, from which a certain number of rays are calculated. Along these rays a detection algorithm may detect several object feature pixels and the actual center point 41 of the ellipse may then be calculated using these pixels.

However, the above-discussed principle is only effective for ideal and undistorted ellipses. When trying to detect a object with more and slighter variations in the grey scale, such as a naturally structured circular object as shown in FIG. 4B, the known principle does not work well, because the detection algorithm detects wrong object feature pixels somewhere in the ellipse. Therefore, to obtain a better result, the area of interest should be specified and closer to the real object feature.

In the example of FIG. 4B, four area indicator lines 32 are shown, which are used to calculate two boundary ellipses (dashed ellipses), between which rays for edge detection are defined. In this example, the button 46f indicating an ellipse with variations in grey scale may be selected. Therefore, since several boundary conditions have been selected, such as the area indicator lines and the selection of an ellipse as parametric shape, it is easier for the detection algorithm to detect correct object feature pixels which actually correspond to the object feature positions. Hence, a good approximation to the elliptical or circular object and its calculated center 41 may be achieved.

Therefore, the feature detection method, herein discussed, may also be applied to diffuse, non-ideal and distorted structures not having clear transitions, since the area of interest is decreased, only allowing some parametric structures to be used. This means that in this case, it may even not be necessary to pre-select the parametric shape by the button 46f for a good approximation to an ellipse, since the area indicator lines 32 already indicate such a shape.

In the following, advantageous modifications of the feature detection method discussed above, are described with respect to FIGS. 5, 6 and 7.

Figure 5:
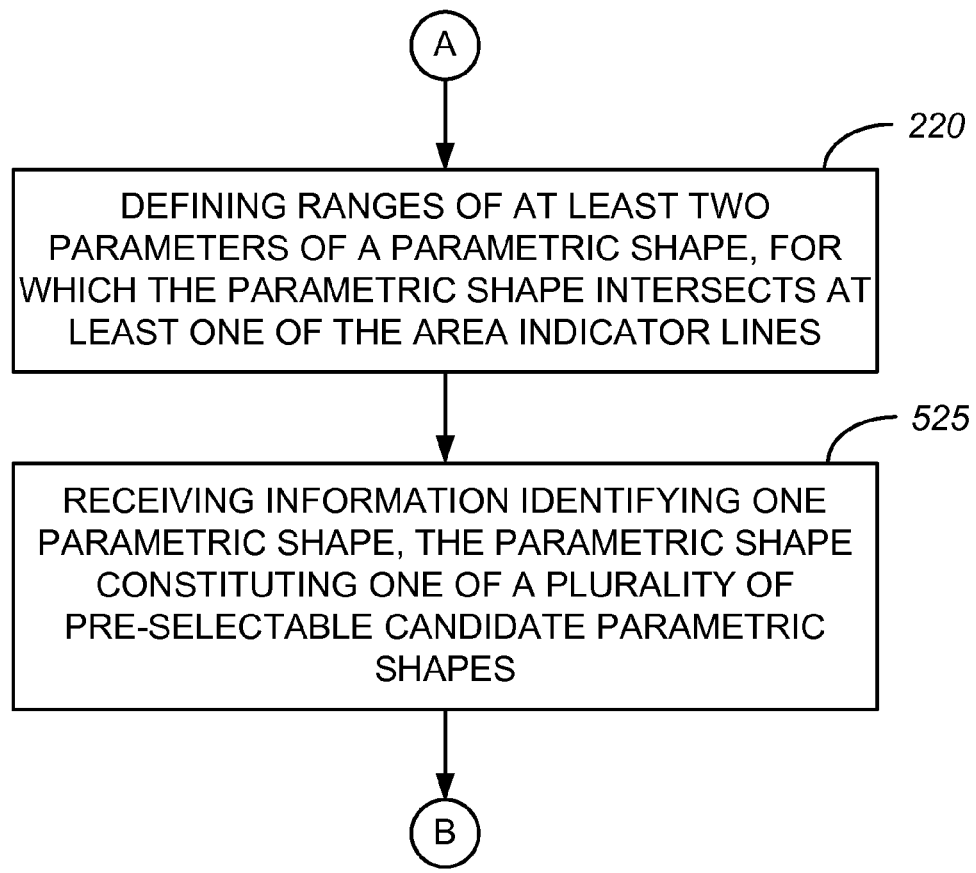
FIG. 5 illustrates operations of a modification of the method shown in FIG. 2.

FIG. 5 describes a modification of the method discussed with respect to FIG. 2. The first two operations 210 and 220 of FIG. 2 are maintained in the example of FIG. 5 and thus are not further discussed to avoid unnecessary repetition.

In an operation 525 following the operation 220, information identifying one parametric shape is received, wherein the parametric shape constitutes one of a plurality of pre-selectable candidate parametric shapes. In other words, a plurality of parametric shapes, such as a parabola, hyperbola, ellipse, etc., is available to provide an approximation to an object feature, thus constituting pre-selectable candidate shapes.

However, when receiving information identifying a particular parametric shape, a boundary condition for the parametric shape is set so that in a fitting procedure to obtain a good approximation to an object feature only a combination of parameter values from the parameter ranges for this particular parameter shape can be selected. Therefore, the processing time to find a good approximation is reduced.

Figure 6:
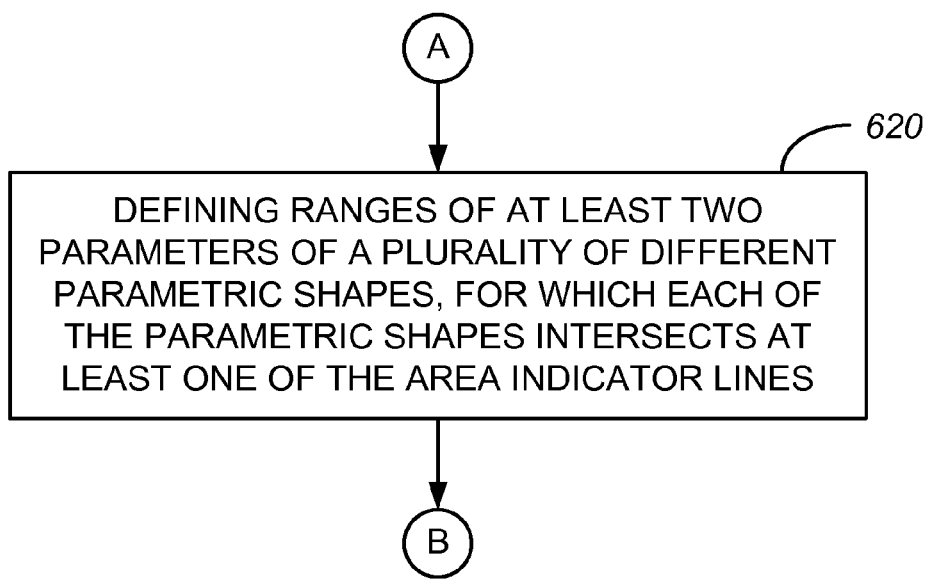
FIG. 6 illustrates operations of another modification of the method shown in FIG. 2.

FIG. 6 describes another modification of the feature detection method. Here, operation 210 is the same as discussed with respect to FIG. 2. In the following operation 620, ranges of at least two parameters of a plurality of different parametric shapes are defined, for which each one of the parametric shapes intersects at least one of the area indicator lines. Basically, a plurality of ranges of a plurality of different parametric shapes is defined, wherein each parametric shape has at least two parameters.

In other words, in this modification, the parameter range defining unit is adapted to define ranges of parameters of more than one type of parametric shape. Therefore, for example, ranges of parameters are calculated for a straight line, a parabola, a hyperbola, an ellipse etc., so that there is a variety of parametric shapes to select from when searching for a good approximation to an object feature. Although defining several ranges for different parametric shapes may lead to increased processing time, the accuracy and quality of the approximation increases.

The next operation is basically identical to operation 230, wherein now a parametric shape from the plurality of different parametric shapes is selected and a suitable combination of parameter values so as to obtain a good approximation to an object feature.

In operation 240, the selected parametric shape based on the selected combination of parameter values is then outputted.

It is also feasible to combine the operations described with respect to FIGS. 5 and 6, wherein in a default setting, until no information identifying a specific parametric shape is received, ranges of parameters of a plurality of different parametric shapes are calculated. After information identifying one parametric shape type is received, it can then easily be referred to the already defined ranges of the identified parametric shape type.

In this context, it may be added that the parameter range defining unit may further define sub-ranges of the at least two parameters of the at least one parametric shape, for which the at least one parametric shape intersects at least two area indicator lines. By setting this additional boundary condition, the amount of possible parametric shapes and combinations of parameter values intersecting at least two area indicator lines reduces the possible combinations of parametric shapes and parameter values.

Figure 7:
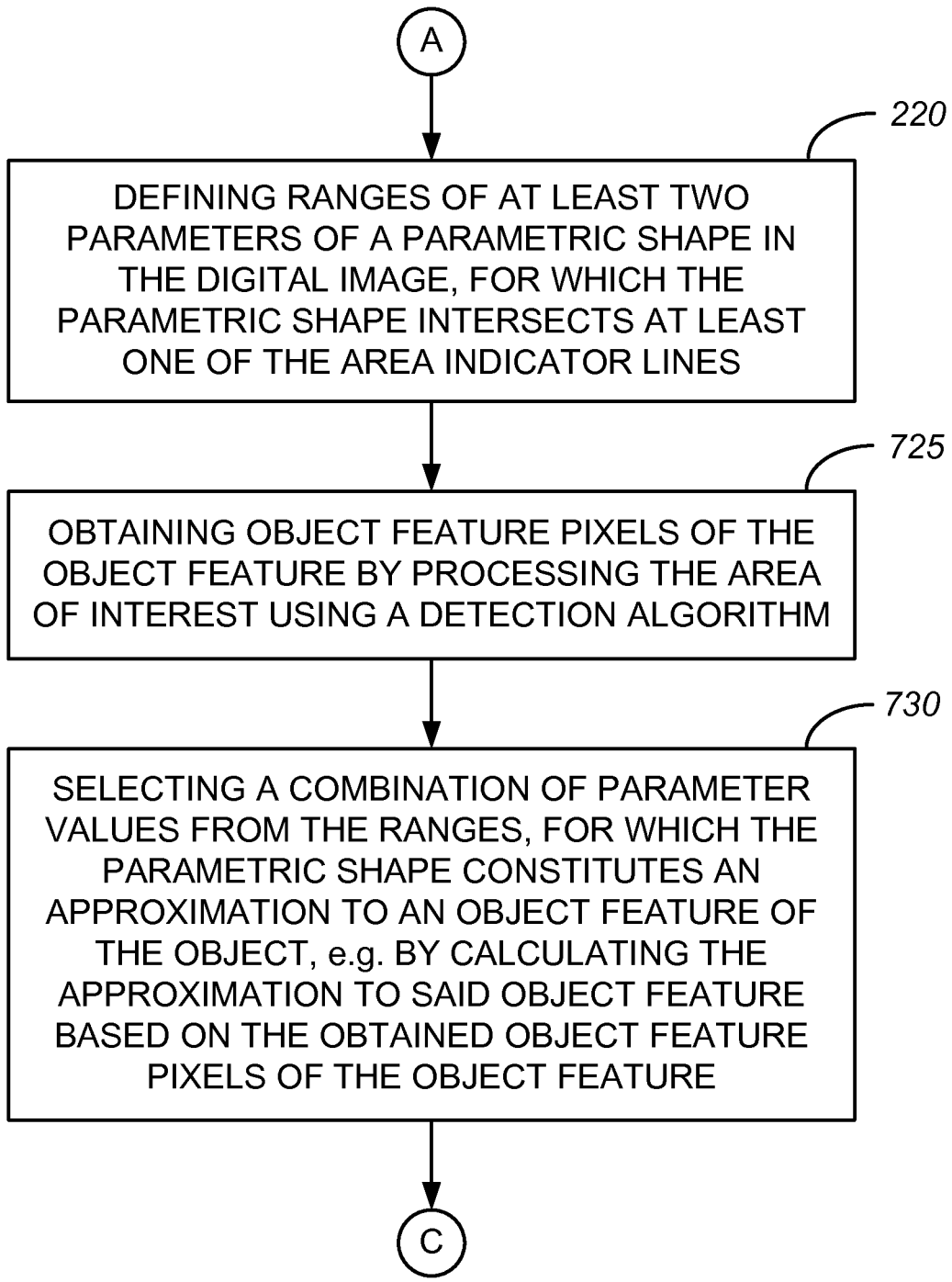
FIG. 7 illustrates operations of another modification of the method shown in FIG. 2.

Next, in FIG. 7, it will be discussed in more detail, how the parametric shape based on a specific combination of parameter values is selected. The first two operations 210 and 220 are identical to the operations 210 and 220 of FIG. 2.

In the next operation 725, object feature pixels of the object feature are obtained by processing the area of interest using a detection algorithm. Hereby, as already mentioned with respect to FIG. 3B, a detection algorithm is applied to the area of interest defined by the area indicator lines 32.

For example, the detection algorithm may be sensitive to grey scale changes so that grey scale changes are monitored in the area of interest. As described in FIG. 3B, a certain number of rays which may be chosen essentially parallel to the area indicator lines, since it is expected that the area indicator lines intersect the object feature, are defined to detect object feature pixels. The number of rays is dependent on the distance from one area indicator line to the other and on the required resolution. In general, when the parametric shape is pre-selected, for example by the button 36a, only a few object feature pixels have to be obtained to define the general direction of the parametric shape, e.g., in FIG. 3b the straight line.

In operation 730, the combination of parameter values from the parameter ranges, for which the parametric shape constitutes an approximation to an object feature of the object, is selected, for example by calculating the approximation to said object feature based on the obtained object feature pixels of the object feature.

In other words, the deviation between the parametric shape based on a combination of parameter values to the object feature pixels is calculated. Hereby, different deviations may be obtained for different combinations of parameter values for one specific parameter shape type and a fitting process may be used to try out several combinations of parameter values until the parametric shape based on a specific combination of parameter values constitutes the best fit approximation to the object feature.

Finally, this parametric shape may be again outputted in operation 240, as described above.

To further enhance the quality of the approximation, it may be necessary to filter out from said obtained object feature pixels object feature pixels exceeding a specific distance to the parametric shape. In a simple case, this may be viewed as an iterative process, in which in a first step a first parametric shape to all object feature pixels is obtained and in a second step, a second parametric shape is obtained based on object feature pixels not including the object feature pixels exceeding the specific distance to the parametric shape, e.g. predetermined by the operator or the system, and thus constituting outliers. In other words, the same fitting procedure is repeated by recalculating the approximation to the object feature based on a different set of object feature pixels, namely the obtained object feature pixels not including the object feature pixels exceeding the specific distance to the parametric shape. However, the distance beyond which a pixel is considered an outlier may also be determined by examining the entire set of object feature pixels including outliers, and so the distance is in fact determined as part of the calculation.

One way of avoiding dealing with the limitations of the detection algorithm and obtain outliers is to select the object feature pixels in the area of interest by the user. For example, the user may indicate or click on different pixels with the operation cursor or the computer mouse or may just use a pen stylus on a touch screen to indicate the object feature pixels.

A further possibility combining the automatic detection and the selection by a user is that the user indicates which object feature pixels he/she perceives as outliers, after detecting the object feature pixels.

Until now, the different units and the operations of the feature detection apparatus 100 have been discussed in detail, and it has been referred to optical surveying instruments with imaging capabilities, such as video tachymeters or video total stations, when it seemed useful to indicate examples for possible areas of use.

Next, it will be discussed how a feature detection apparatus may be integrated in an optical instrument, such as a surveying instrument with imaging capability. Hereby, it will be referred to FIG. 8, in which an optical instrument with an integrated feature detection apparatus 100 is shown.

Figure 8:
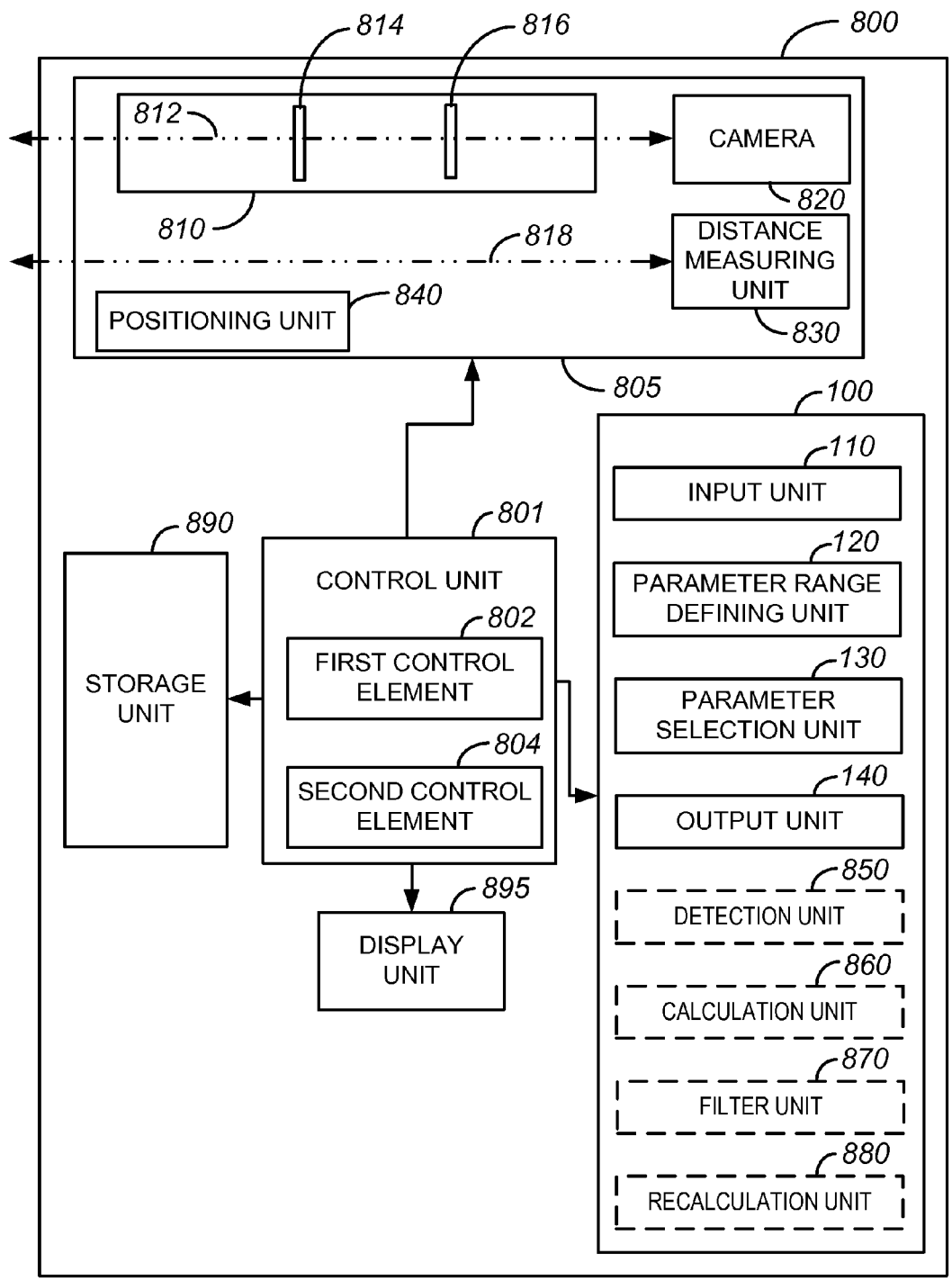
FIG. 8 illustrates an optical instrument according to another embodiment of the invention.

FIG. 8 illustrates an optical instrument 800 according to another embodiment incorporating the feature detection apparatus 100 described above.

In this embodiment, the feature detection apparatus 100 of FIG. 1 is shown with further optional units, i.e. detection unit 850, calculation unit 860, filter unit 870, and recalculation unit 880, shown with dashed lines.

In addition to the feature detection apparatus 100, the optical instrument 800 also comprises a control unit 801 including a first control element 802 and a second control element 804, an acquisition unit 805, a storage unit 890 and a display unit 895.

The control unit 801 is connected to the acquisition unit 805 to exchange data, for example, the control unit may instruct the acquisition unit 805 to acquire data and the acquired data is sent to the control unit 801. Any type of data transmission is conceivable, such as fixed line or wireless data transmission, electronically or optically.

The control unit 801 with the first control element 802 and the second control element 804 may be realized by a hardware arrangement, such as by hard wired circuits, or ASICs or software or any suitable combination of the above.

The acquisition unit 805 comprises a lens arrangement 810, a camera 820, a distance measuring unit 830 and a positioning unit 840, wherein the operations of these elements are controlled by the control unit 801.

In detail, the lens arrangement 810 comprises at least two lenses 814 and 816, which are placed preferably removable, in a housing to form a device, such as a telescope. The optical axis 812 of the lens arrangement 810 is shown perpendicular to a camera 820 and optimally coinciding with the optical axis of the camera 820.

In an example, the lens arrangement 810 is adapted to focus onto an object for sighting the object and the camera 820 is aligned with the optical axis 812 of the lens arrangement 810 acquiring an image of at least part of the object and is preferably positioned behind the lens arrangement in its image plane.

The camera 820 may be constituted by any suitable image device, for example, a two-dimensional array of sensor elements capable of generating image information with a number of pixels generally corresponding to the number of elements of the array, such as a charge-coupled device (CCD) camera or a complementary metal-oxide semiconductor (CMOS) camera. Such a sensor array may be composed of 1000×1000 sensor elements to generate digital images with $10^6$ image pixels. In an optical instrument, such as a video tachymeter or tacheometer, the actual viewing direction may be defined by a line of sight from a point on or by one of the elements of the two-dimensional arrangement of sensor elements, e.g. near or at the center of the array, and through at least one lens.

The distance measuring unit 830 of the acquisition unit 805 is provided for measuring a distance from the optical instrument to the object along a measurement axis 818 of the distance measuring unit parallel to the optical axis 812 of the lens arrangement. Alternatively, the measurement axis may also coincide with the optical axis.

The distance measuring unit 830 provides a corresponding measurement value to the control unit 801. For example, the distance measuring unit 830 includes a coherent light source, such as an infrared laser or another suitable laser distance measuring device as known in the art, and preferably a fast reflector-less working EDM.

The positioning unit 840 is provided for adjusting the optical axis of the lens arrangement relative to at least one reference axis. For example, the positioning unit 840 is realized by an electro-mechanical arrangement comprising preferably magnet servo drives or any other fast drives for precisely positioning the acquisition unit 805.

It is noted that the positioning unit 840 in FIG. 8 is shown as forming part of the acquisition unit 805 but the positioning unit may also be provided independently in the optical instrument, since it serves to move the lens arrangement 810, camera 820 and distance measuring unit 830 to a position enabling to sight the object and optionally take a distance measurement of this position of the object.

Since the positioning unit 840 includes movable components, such as drives, parts of the positioning unit 840 maintain their position in space, i.e. their position is fixed with respect to, for example, a tripod, on which the optical instrument is placed, and parts of the positioning unit 840 move in space with respect to a fixed coordinate system, for example, defined by an intersection point of all three axis of the optical instrument, referred to the origin, and its alignment with a base, such as a tripod, stand or other support (not shown).

During operation of the optical instrument shown in FIG. 8, the control unit 801 controls the acquisition unit 805, thereby the first control element 802 may define in an acquired image an area to be scanned, obtain an object feature and communicate the data with the feature detection apparatus 100.

Then, the first control element 802 may define a position on the object, such as an excellent point, a special position on the object feature corresponding to a specific measurement pixel in the image, may convert the measurement pixel into an approximation of coordinates of this position, in terms of horizontal and vertical angles, and transmit this information to the second control element 804.

Subsequently, the second control element 804 may instruct the positioning unit to adjust the optical axis of the lens arrangement 805 onto this position on the object, and preferably on the object feature, and instruct the distance measuring unit to measure the distance to this position on the object.

A more detailed description of such an optical instrument may be found in the International Patent Application PCT/EP2007/000706, which is hereby incorporated by reference.

In the following, the feature detection apparatus 100 incorporated in the optical instrument 800 will be described in more detail, in particular with respect to the interface and data exchange with the control unit 801.

As described above, the camera 820 acquires a digital image of an area of interest comprising parts of an object. This digital data is then provided to the feature detection apparatus 100, for example, by the control unit 801, instructing the transmission of the data. Further, this data may also be provided to the display unit 895, where the digital image may be displayed.

In this example, the display unit 895 may be a display unit with touch screen capabilities so that also information may be inputted in the display unit 895. Meanwhile, the input unit 110 receives at least two area indicator lines for defining an area of interest, for example, the area indicator lines may be marked on the touch screen of the display unit 895 by simple strokes by a user, whereupon this information is sent to the input unit HC.

Once the feature detection apparatus 100 has obtained all information about a digital image and the position of at least two area indicator lines, the parameter range defining unit 120 defines ranges of at least two parameters of a parametric shape to be introduced into the digital image, for which the parametric shape intersects at least one of the area indicator lines. This operation has been discussed in detail before and it is referred to previous sections to avoid unnecessary repetition.

Next, the parameter selection unit 130 selects a combination of parameter values from the parameter ranges defined previously, for which the parametric shape constitutes an approximation to an object feature of the object in the area of interest.

It has been discussed before that in order to obtain a good approximation to an object feature, it is necessary to detect several pixels of the object feature in the digital image, namely object feature pixels have to be detected reliably. In the embodiment of FIG. 8 this may be done by the detection unit 350 by processing the area of interest using a detection algorithm, for example, a known edge detection algorithm of the prior art detecting grey scale changes or similar.

Subsequently, a combination of parameter values, for which the parametric shape constitutes an approximation to the object feature, is selected by calculating the approximation to the object feature based on the obtained object feature pixels, which has been described above in detail. This calculation may be performed by the calculation unit 860, but may alternatively also be performed by the control unit 801.

It should be understood that the detection unit 850 and calculation unit 860 may optionally be also separated from the feature detection apparatus 100 and just interfaced with the control unit 801 or directly with the feature detection apparatus 100. Alternatively, the functions of the detection unit 850 and the calculation unit 860 may also be performed by different units, such as directly by the control unit 801.

Preferably, the feature detection apparatus 100 comprises also a filter unit and a recalculation unit 880 to filter out from the obtained object feature pixels object feature pixels exceeding a specific distance to the parametric shape so that the recalculation unit may recalculate the approximation to the object feature based on the obtained object feature pixels not including the object feature pixels exceeding the specific distance to the parametric shape.

Then, the output unit 140 outputs the parametric shape based on the combination of parameter values to the display unit 895 or storage unit 890.

For example, the display unit 895 displays the parametric shape based on the selected parameter values superimposed on the object feature in the digital image so that a user may verify the quality of the approximation.

The user may then define a measurement pixel corresponding to a position to be measured, which may be an excellent point of the object, namely a position on an object feature.

Then the pixel location of the measurement pixels is converted into an approximation of coordinates of the position on the object to be measured. A method for calibration of the instrument and converting pixels of an image into coordinates of a position on an object, which requires assuming a default distance to the position, is described in WO 2005/059473 A2, which is herewith incorporated by reference.

Knowing the coordinates, or at least a good approximation of the coordinates of the position to be measured, i.e. the horizontal angle and the vertical angle with respect to a coordinate system of the optical instrument, the positioning unit 840 may adjust the optical axis of the lens arrangement 810 onto the position to be measured.

Next, the distance measuring unit 830 may then be instructed to measure the distance by known distance measurement methods such as the pulse method, in which the propagation time of a signal is measured, which is directly proportional to the distance, since the speed of light and the refractive index of the medium are known, or the phase method, in which the phase of a transmitted wave from the instrument and the phase of a back reflected wave are compared.

Since the pixel to coordinate conversion may require assuming a default distance to the object, it is possible to obtain more exact coordinates corresponding to the measurement pixel by recalculating the coordinates of the position based on the measured distance, which may be performed by the control unit 801. Subsequently, the recalculated coordinates may be stored or displayed, or the optical axis of the lens arrangement 805 can be adjusted onto the new position to be measured using the recalculated coordinates and optionally the distance to the new position may be measured again.

Therefore, it is possible to measure the horizontal and vertical angles as well as the distance to a determined position of the object very accurately and thus obtain three-dimensional data. This data may be stored or viewed in terms of three-dimensional data in the coordinate system of the optical instrument or an object coordinate system with the origin not placed in the instrument but in the object.

Here, it may be mentioned that a position on the object may be defined by Cartesian coordinates defined with respect to a Cartesian coordinate system having three axes orthogonal to each other. For measuring position, spherical coordinates, however, may be more appropriate in some cases.

In detail, the position of the object may be defined in spherical coordinates by its distance to an origin of an orthogonal coordinate system, an angle (horizontal angle) between one of the horizontal axis of the coordinate system and a line connecting the origin of the coordinate system with a projection of the position onto the horizontal plane and finally a vertical angle between the coordinate system axis orthogonal to the horizontal plane and a line connecting the origin of the coordinate system and the position. Cartesian coordinates can be transformed into spherical coordinates and vice versa. Usually, the origin of the coordinate system is placed in the optical instrument, optimally also coinciding with the projection center of the camera.

In an ideal optical instrument with a camera and a distance measuring unit, the projection center of a camera is identical with the intersection point of all three axes of the optical instrument and the distance measurement is taken from the intersection point along a direction orthogonal to the image plane. Then, the center of the image plane, e.g. a pixel, is the exact image of the position hit by laser light of the distance measuring unit. Ideally, it is thus possible to assign to each position in real space around the optical instrument, a pixel in the image plane, wherein said pixel may be the same for several positions, since the image plane is a two-dimensional representation of three-dimensional space.

Since the camera 820 is rotatable about a vertical axis for panning fixed with respect to the base of the instrument, for example a tripod or other support, and is rotatable about a tilting axis, images may be taken of a sphere around the instrument. For example, panoramic images may be taken by stitching together single images.

Further, the optical axis of an ideal camera should be perpendicular to the image plane and should coincide with the optical axis of an optical system, such as the lens arrangement, and the optical system should be free of aberrations or distortions.

However, the above only constitutes an idealization of an optical instrument with an ideal camera and such ideal conditions can not always be assumed. Therefore, there is a need for improved mapping between positions in space and corresponding pixels in the image and the camera has to be calibrated with respect to the axis system of the optical instrument with a known interior camera orientation. For example, such a method for calibration and conversion has been discussed in WO 2005/059473 A2, which is herewith incorporated by reference, where the interior and exterior orientation of a camera in an optical instrument have been precisely defined.

Therefore, by knowing the interior camera orientation, i.e., focal length, principle point and distortion, as well as exterior camera orientation, i.e. position of the imaging array with respect to the axis system of the optical instrument, good results for converting pixels of the digital image into positions may be achieved, e.g. with the method of WO 2005/059473 A2.

Hence, by iteratively, in this example two times, determining the position to be measured on the object, the accuracy of the coordinates and distance of the position can be improved.

As an alternative to conversion algorithms, conversion tables may be defined to look up a specific position corresponding to a pixel in the image, wherein different tables may be defined for different distances from the instrument to the object to be measured. In this case, an iterative approach is also preferred, since optimally different conversion tables have to be provided for different distances, whereby for the first "approximate" conversion a conversion table of a default or assumed distance has to be used. Subsequently, a conversion table for the measured distance may be used.

In the following, the operations of FIG. 9 will be outlined in detail. The operations of FIG. 9 may be performed by the optical instrument 800 and are similar to the operations discussed when describing FIG. 8.

Figure 9:
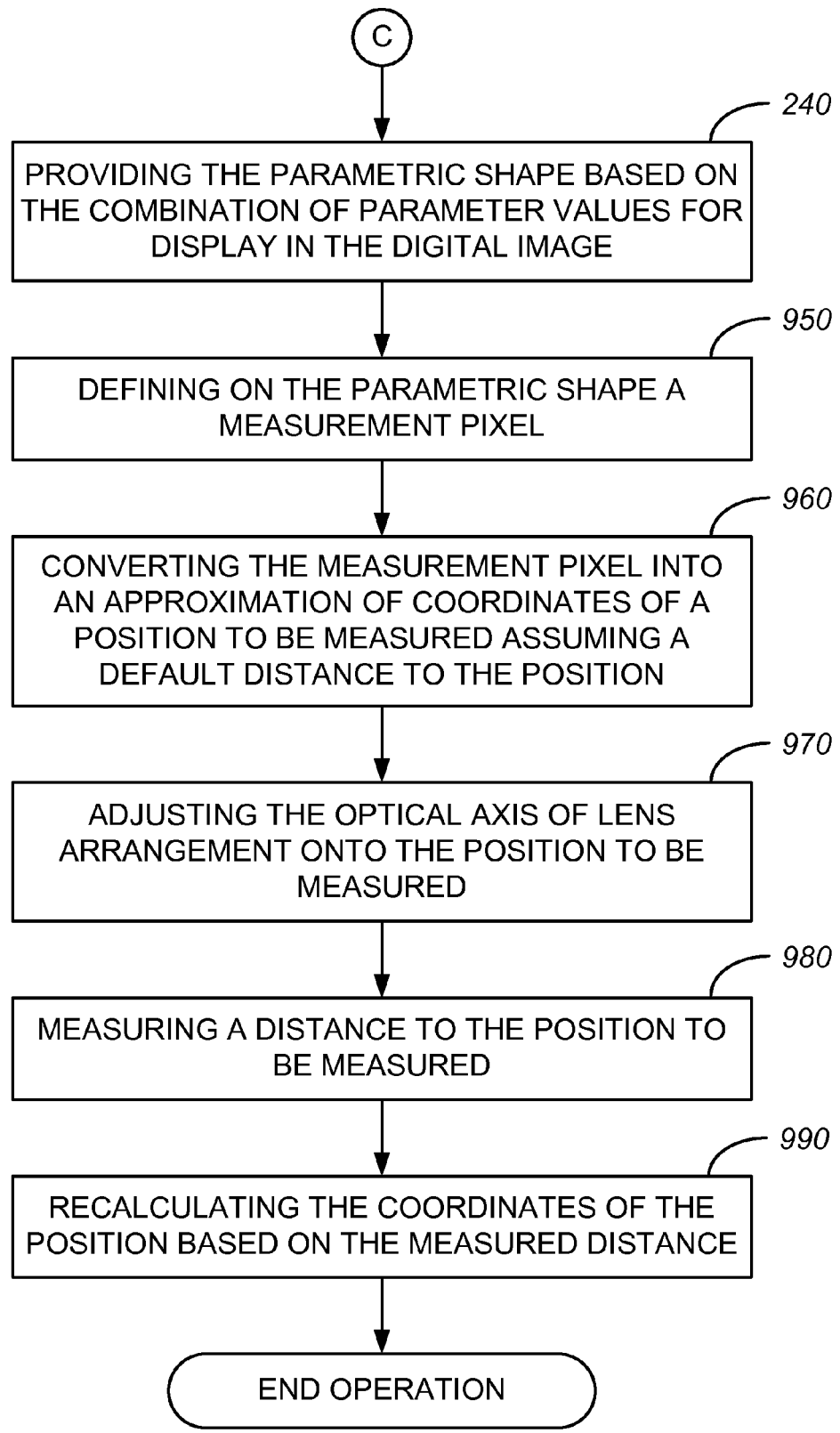
FIG. 9 illustrates operations of a method for obtaining accurate distance and image information according to an embodiment of the invention, particularly illustrating pre-scan operations.

The method of FIG. 9 starts with the operations 210 to 230, which have been discussed in detail with respect to FIG. 2. Therefore, the method of this embodiment will be described starting with operation 240 and it is assumed that a combination of parameter values of a parametric shape, for which the parametric shape constitutes an approximation to an object feature is selected according to the methods discussed above.

In operation 240, the obtained parametric shape based on the combination of parameter values is then provided for display in the digital image. As described above, the digital mage may be displayed in a display unit 895 and the parametric shape may be superimposed on the digital image, and in particular, on an object feature of an object shown in the digital image.

In operation 950, a measurement pixel is defined on the parametric shape. To be more specific, a user may define a measurement pixel corresponding to a position on the object, for which three-dimensional position information should be obtained.

Alternatively, measurement pixels may also be defined on the parametric shape automatically, for example, the control unit 801 may define on the parametric shape between the area indicator lines measurement pixels spaced apart by a predetermined distance according to resolution requirements.

In operation 960, the measurement pixel is converted into an approximation of coordinates of a position to be measured assuming a default distance to the position. Thereby, known conversion algorithms or tables may be used, such as the ones discussed above, which take into account the internal arrangement of the elements of the optical instrument and an assumed distance to the object.

In operation 970, the optical axis of the lens arrangement 810 is adjusted onto the position to be measured. This adjustment is to be carried out by the positioning unit 840, as described above, which includes physically moving the acquisition unit 805 such that the optical axis of the lens arrangement 810 points to the position to be measured.

Since the distance measuring unit 830 is also included in the acquisition unit 805, which has been moved by the positioning unit 840, also the optical axis 818 of the distance measuring unit 830 points to the position to be measured. Therefore, in operation 980, the distance to the position to be measured can be measured with the distance measuring unit 830 using the above-described distance measuring methods.

In operation 990, the measured distance is used to recalculate the coordinates of the position. For the recalculation of the coordinates, the same conversion algorithm is used as in operation 960, however, now the default distance is replaced by the measured distance so that even better results for the coordinates of the position to be measured are achieved.

In the following, FIGS. 10A to 10E describe concrete examples of the operations performed by the feature detection apparatus.

Figure 10A:
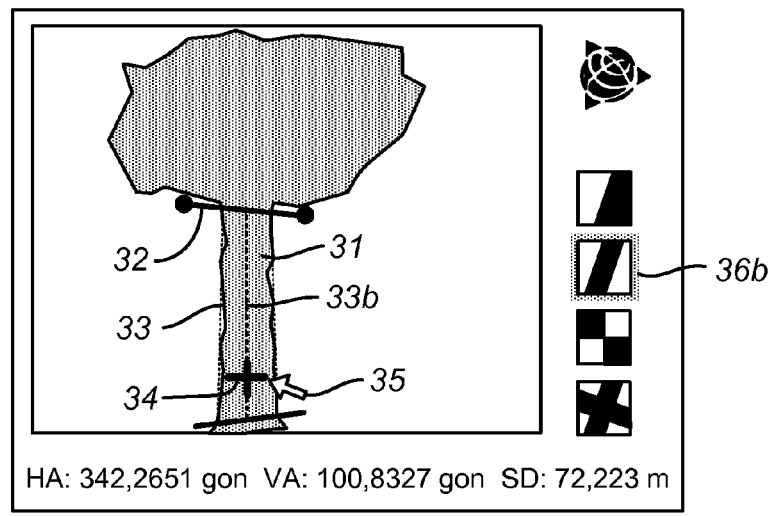
FIGS. 10A-10E illustrate several examples, in which the feature detection apparatus and method are applied.

In FIG. 10A, a tree-like structure is shown in a digital image of a screen. Further, two area indicator lines 32 define the area of interest. Therefore, according to the previous embodiments, parameter ranges of a parametric shape can be defined so as to intersect at least one of the area indicator lines.

In this example, one area indicator line is based on two indicator points, shown at the left and right end of the upper area indicator line 32. This indicates that instead of providing an area indicator line, the input unit 110 may simply be adapted to receive at least two indicator points to define the end points of one area indicator line.

Further, it is also possible to derive two area indicator lines from two indicator points (not shown), one on each area indicator line, wherein the area indicator lines extend through the indicator points, respectively, so that the area indicator lines define an essentially rectangular area of interest.

In this case, it may only be necessary to predefine a length of an area indicator line to clearly define the rectangular area of interest, since as shown in the examples of FIGS. 10A to 10E, the indicator lines should always roughly face each other and be essentially parallel to form an essentially rectangular area. Accordingly, the provision of two indicator points, by for example a user, may be sufficient to derive an area of interest.

In the specific example of FIG. 10A, there are two object features of the object, namely the right side and the left side of the trunk of the tree-like structure. Therefore, two object features to be interpolated are received after analysis of the detection algorithm. To simplify the detection by the detection algorithm, information may be provided to indicate that two linear object features are present in the area of interest. This information may be provided with the button 36b. Further, this information also indicates that for fitting purposes two linear parametric shapes should be used, which are shown in FIG. 10A as dashed approximation lines 33.

In this example, the parameter selection unit 130 is adapted to select another, in this case second, combination of parameter values from the parameter ranges, for which the second parametric shape based on the second combination of parameter values constitutes an approximation to the second object feature in the area of interest. Further, a central line 33b between the two parametric shapes may be calculated as shown in FIG. 10A.

Similar to the above, a measurement cursor 34 can be moved by an operation cursor 35 to define the position to be measured.

Figure 10B:
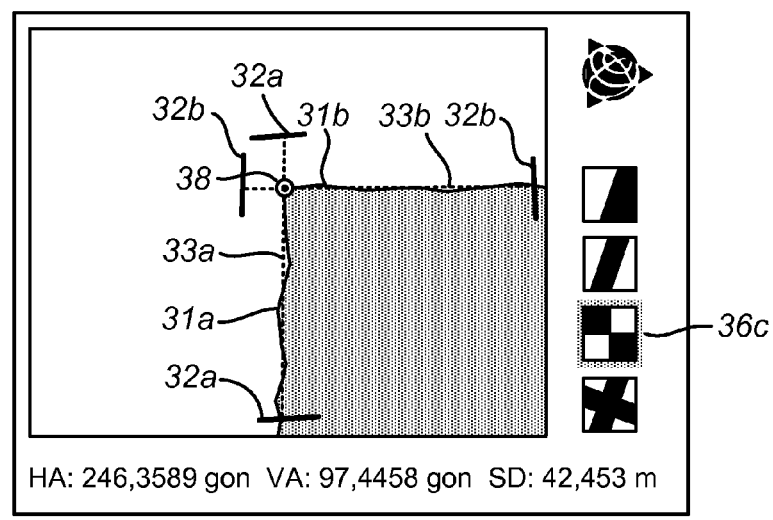

FIG. 10B is a specific sample describing the measurement of a corner of a square structure by interpolating the object features 31a, 31b and determine the intersection 38 of both object features. In this example, four area indicator lines 32a, 32b are shown defining two areas of interest. In each area of interest, there is one object feature 31a, 31b, respectively. Consequently, for the first area of interest, first parameter ranges are defined, for which the parametric shape intersects at least one of the area indicator lines 32a and for the second area of interest, there are defined second parameter ranges, for which the second parametric shape intersects at least one of the area indicator lines 32b.

Next, a first combination of parameter values, for which the first parametric shape constitutes a first approximation 33a to the first object feature 31a is selected and a second combination of parameter values, for which the second parametric shape constitutes a second approximation 33b to the second object feature 31b is selected.

Finally, the intersection point, namely the corner where the two object features meet, may easily be calculated as the intersection point 38 of the two parametric shapes constituting the two approximations.

To further enhance the performance of the apparatus, information indicating a corner measurement may be provided by activating the button 36c, similarly as discussed in FIG. 10A.

Figure 10C:
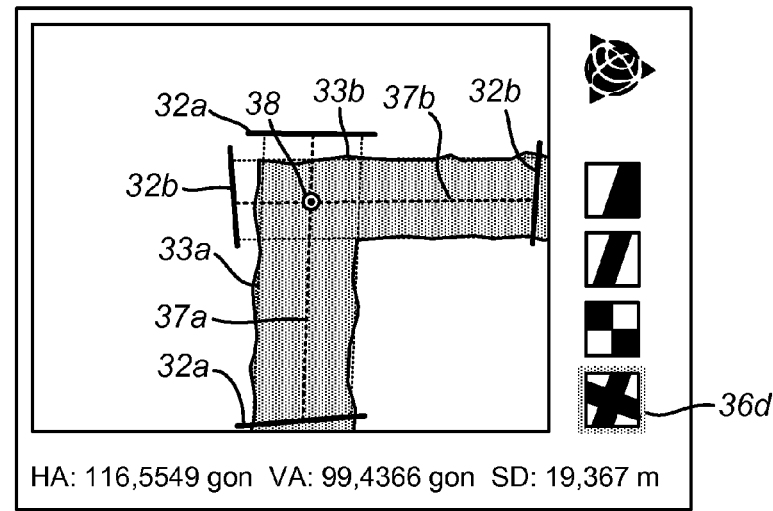
Figure 10D:
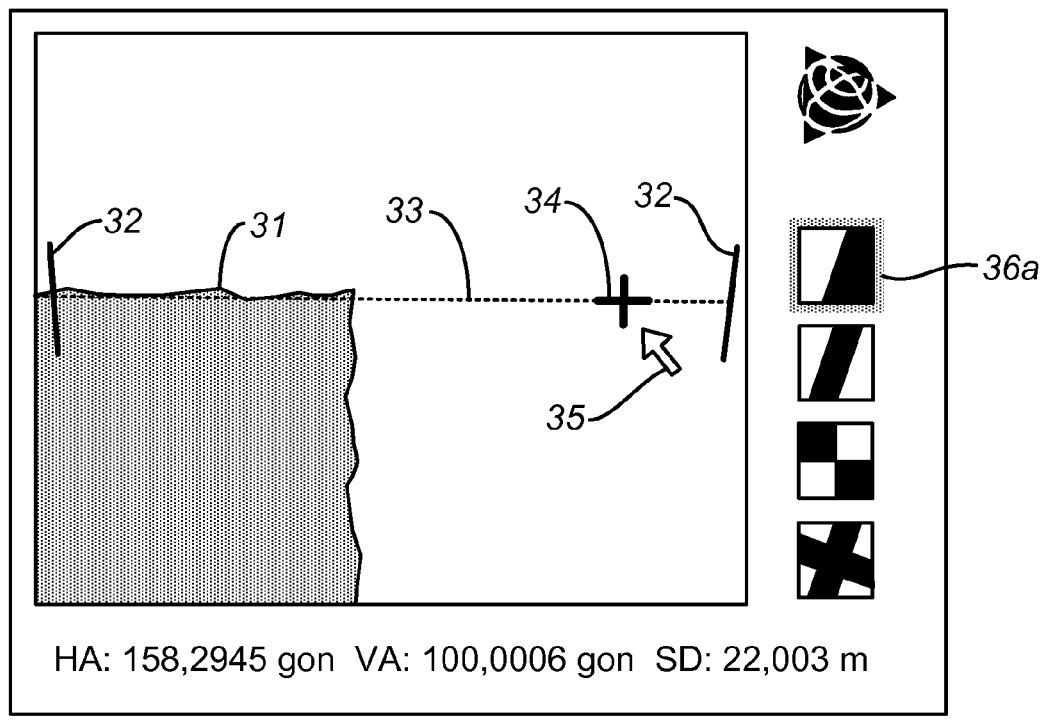

FIG. 10C basically describes a combination of the operations discussed with respect to FIGS. 10A and 10B.

Here, two areas of interest are again shown by four area indicator lines 32a, 32b. Further, two object features may be found in each area of interest. Therefore, in each area of interest, two combinations of parameter values of two parametric shapes constituting two approximations to two object features are selected, such as the two approximation lines 33a of the first area and the two approximation lines 33b of the second area.

Further, a central line 37a between the two parametric shapes of the first area and a central line 37b between the two parametric shapes of the second area can be calculated. Additionally, also the intersection point 38 of the intersection of the two central lines 37a, 37b can be calculated. By activating the button 36d in FIG. 10C, it may be indicated that two areas of interest each having two object features are present in the digital image.

It has to be noted that in FIGS. 10A to 10C, it is not necessary that the object feature and an area indicator line intersect, since the object feature may simply be extrapolated by the parametric shape approximation, which then intersects the area indicator line.

FIG. 10D shows again a square object having two object features, similar to FIG. 10B. However, in this case, only two area indicator lines 32 are provided so that only one area of interest is defined. Here, the object feature 31 is approximated by the approximation line 33, which has a linear parametric shape. As can be seen, the approximation line is extrapolated to be a prolongation of the object feature 31. The measurement cursor 34 indicates that also measurements may be performed on points, which are not positioned on the object itself. The button 36a indicates that only one object feature is present and a linear parametric shape for approximation should be used.

Figure 10E:
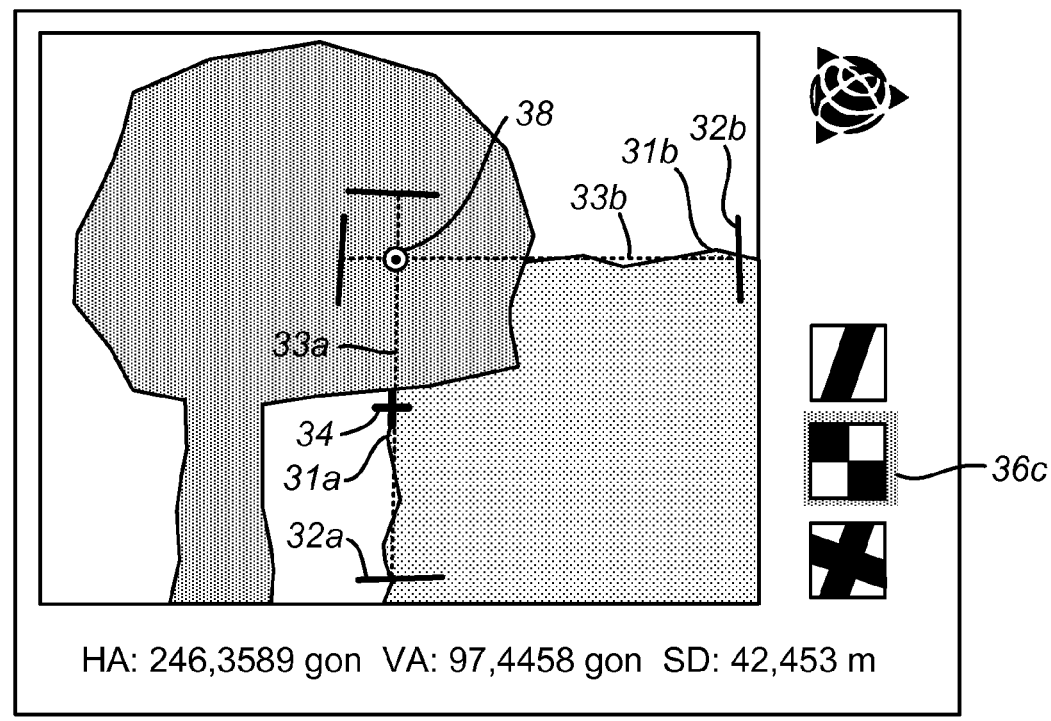

FIG. 10E shows an example, in which a square object, similar to the one shown in FIG. 10B, is partly hidden behind a treelike structure. This square object has two object features 31a, 31b. As in FIG. 10B, four area indicator lines, two for each area of interest, are shown. In this example, it may be assumed that the square object represents a wall located behind a tree.

Although the intersection point 38, namely the corner of the square object, where the two object features meet, is not visible, it is still possible to calculate the three-dimensional position of the intersection point. Using two parametric shapes with selected parameter values, the two object features may be approximated, as can be seen by the approximation lines 33a, 33b. Thus an intersection point in two dimensions, namely on the image, may be reconstructed.

As discussed above, it is possible to convert the pixel corresponding to this intersection point in the digital image to a horizontal and a vertical angle, namely the direction coordinates of the position of the intersection point of the real object. Further, by simply assuming that the wall is essentially perpendicular to the ground, a good approximation of the distance of the corner 38 is obtained by simply measuring the distance of a position just below the hidden part of the wall, indicated by reference numeral 34.

In the following, FIGS. 11A to 11C will be described, which represent practical applications of the previously discussed embodiments. In these figures non-linear objects are shown as they often appear in reality.

Figure 11A:
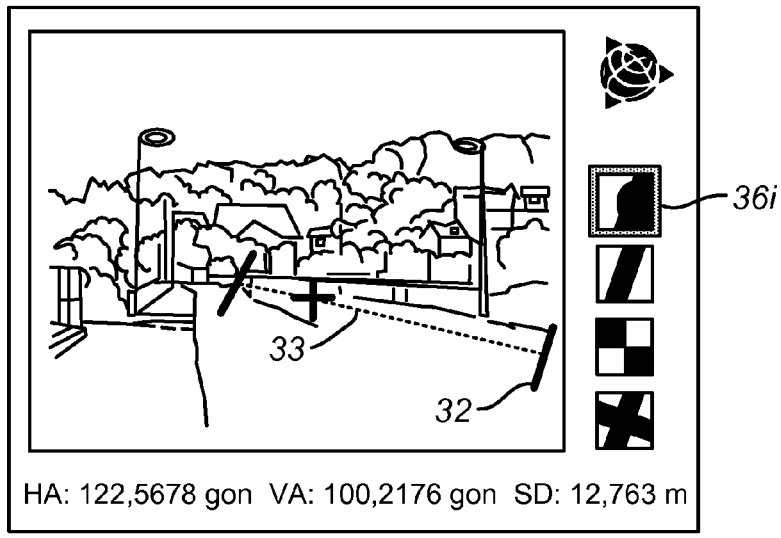
FIGS. 11A-11C illustrate practical applications of the feature detection apparatus and method.

In FIG. 11A, a non-linear object, like a curb, is shown. This example is similar to the one shown in FIG. 2, however, a simple approximation with a linear parametric shape is not possible.

In detail, the area of interest is again defined by two area indicator lines 32 and the object feature is approximated by a non-linear parametric shape with suitable parameter values. A measurement cursor is shown on the parametric shape, which can be moved to different positions to be measured. Button 36i indicates that a non-linear parametric shape should be used in the fitting procedure and may be activated to enhance and speed up the fitting.

Figure 11B:
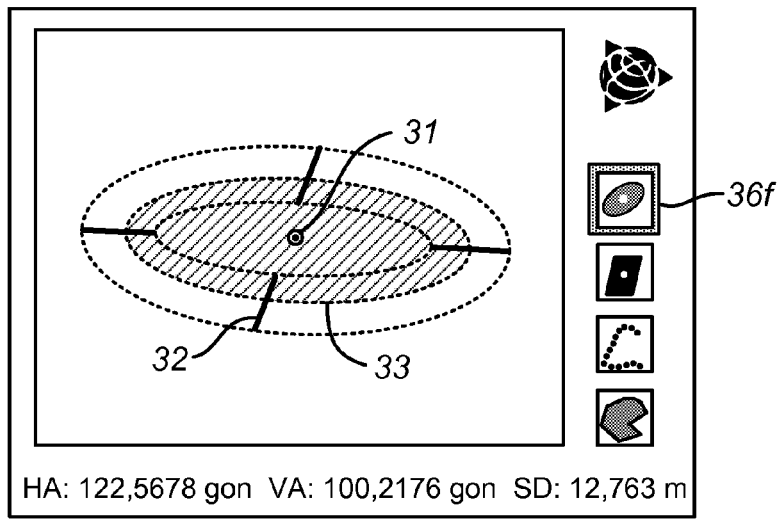

FIG. 11B is similar to FIG. 4B and shows a realistic example of an ellipse, such as a manhole on the street.

In a digital image acquired at an angle, the usually circular manhole has an elliptic shape. Further, as indicated by the grey scale in the image, it is hard to differentiate between the manhole and the street, i.e. the ellipse is not ideal and distorted.

However, as shown in FIG. 11B, with the method and the apparatus discussed above, it is possible to obtain a very good approximation of the manhole. In this example, four area indicator lines 32 are shown, limiting the area of interest. As a further limitation or boundary condition, it is possible to select button 36f which indicates to the system that the object feature to be found and approximated is an ellipse.

Figure 11C:
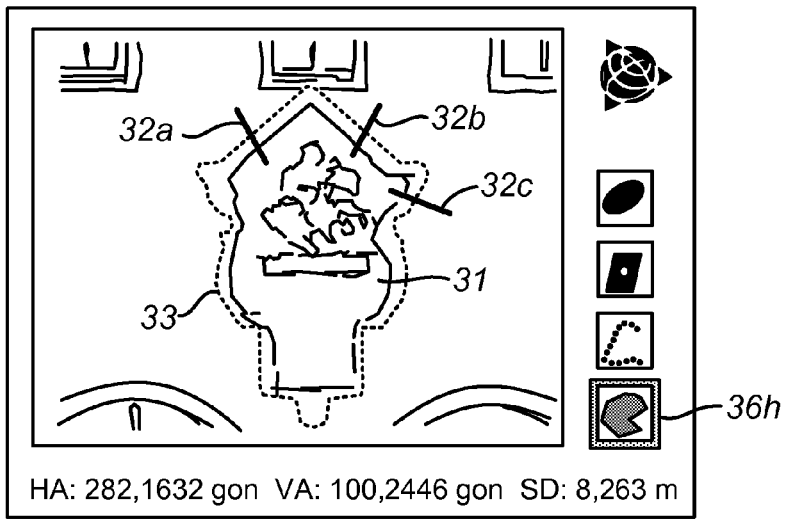

Another example showing a non-linear structure is described with respect to FIG. 11C.

In FIG. 11C, a relief on top of a wall of a house is shown. The outline of the relief is shown by a dashed line. Since the outline of the relief is very jagged and changes the shape frequently, several area indicator lines may be needed to obtain good approximations in each sub-area of interest defined by two area indicator lines, such as the sub-area of interest between area indicator line 32a and area indicator line 32b or the sub-area of interest between area indicator line 32b and area indicator line 32c.

It should be noted that a parametric shape in the sense of this application does not have to be a functional mathematical expression, but it is also feasible to provide basic forms of a specific shape which may be stretched and pressed, e.g. by a suitable multiplier, to constitute good approximations to an object feature in the area of interest.

Furthermore, the parametric shape used to fit the object feature may be a linear or non-linear combination of different parametric shapes or basic forms so that a vast variety of non-linear object features may be approximated. In any case, it is always feasible to detect the object feature using only the detection algorithm so that any desirable object feature may be detected.

After detecting the outline of the relief 31, positions in the relief or at the edges thereof may be automatically measured and scanned by the optical instrument.

Figure 12:
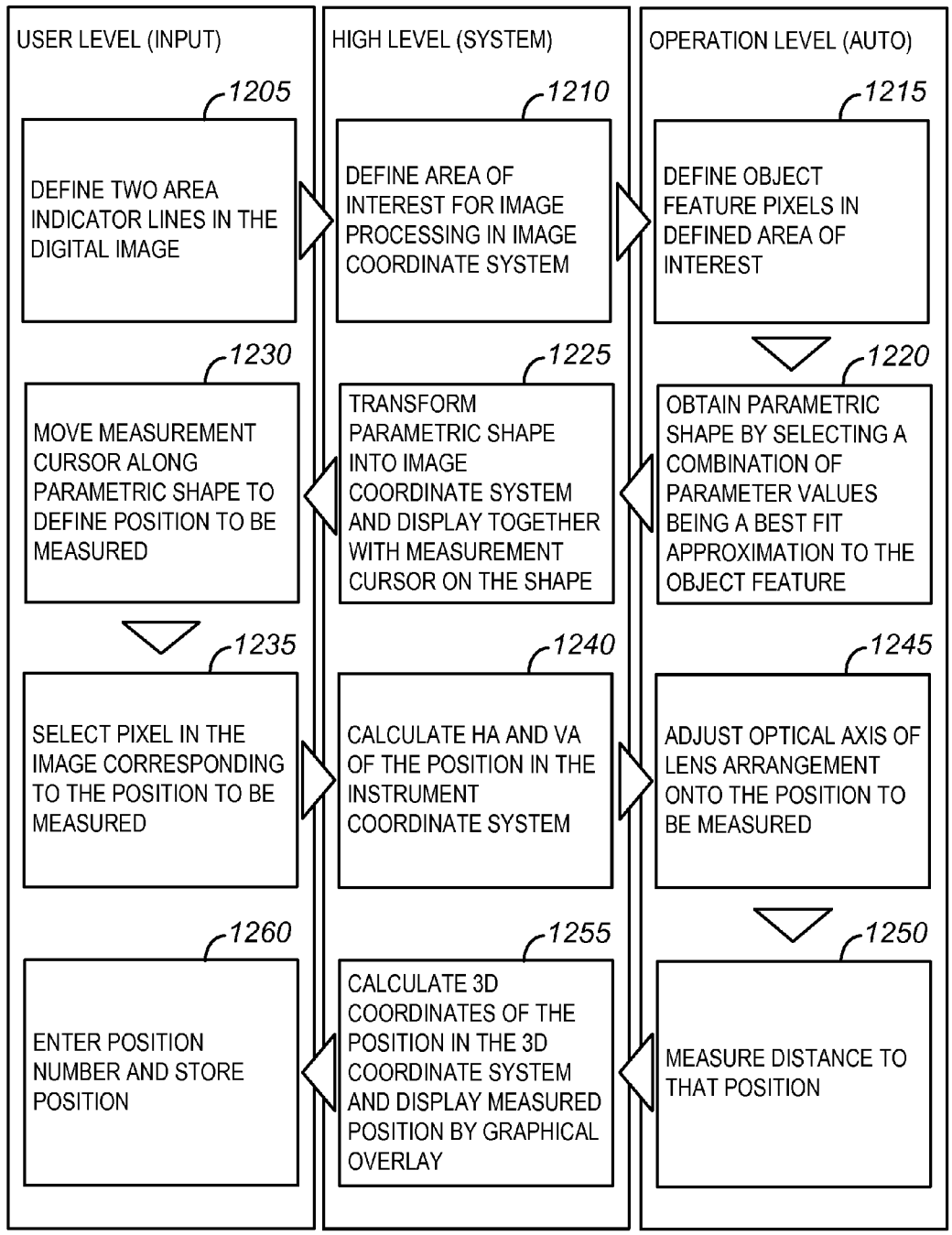
FIG. 12 is a workflow diagram illustrating the different operations of the feature detection method on different levels.

In the following, a workflow diagram is discussed with respect to FIG. 12, summarizing the previously described operations.

In operation 1205, two area indicator lines are defined in a digital image on the user level. In operation 1210, the area of interest for image processing in the image coordinate system is defined on a high level. Then, in operation 1215, object feature pixels are detected in the defined area of interest on an operation level.

In operation 1220, a combination of parameter values is selected to obtain a parametric shape, which is a best fit approximation to the object feature using the detected object feature pixels. Subsequently, in operation 1225, the parametric shape is transformed into the image (pixel) coordinate system and may be displayed together with a measurement cursor on the parametric shape. This measurement cursor may then be along the parametric shape to define a position to be measured in operation 1230.

In operation 1235, a pixel in the image is selected that corresponds to the position to be measured. Based on this measurement pixel, a horizontal angle and a vertical angle of the position in the instrument coordinate system are then calculated in operation 124C. In operation 1245, the optical axis of lens arrangement 810 is adjusted on the position to be measured.

Once the optical axis is adjusted, the distance to this position can be measured in operation 1250. From this distance, the new coordinates of the position, namely new horizontal angle and vertical angle, may be recalculated as discussed above, if desired, or the previously calculated horizontal angle and vertical angle may be maintained.

The combination of the horizontal angle, vertical angle and the distance is then used to calculate the three-dimensional coordinates of the position in the three-dimensional coordinate system and the measured position may be displayed by graphical overlay in operation 1255. Finally in operation 1260, a position number can be entered and the position can be stored, for example in the storage unit 890.

According to another embodiment, a non-transitory program may be provided including instructions adapted to cause a data processor that may be included in the feature detection apparatus 100 or the control unit 301 to carry out combinations of the above operations.

The program or elements thereof may be stored in a memory, such as the storage unit 890 of the optical instrument, and retrieved by the processor for execution.

Moreover, a non-transitory computer readable medium may be provided, in which the program is embodied. The non-transitory computer readable medium may be tangible such as a disk or other data carrier or may be constituted by signals suitable for electronic, optic or any other type of transmission. A non-transitory computer program produce may comprise the non-transitory computer readable medium.

It should be understood that the operations described herein are not inherently related to any particular apparatus or instrument and may be implemented by any suitable combination of components. The feature detection apparatus illustrated in FIG. 1 and the optical instrument illustrated in FIG. 8 and described in detail above, constitute preferred embodiments to perform the operations of the described methods. However, this may not be limited to the same.

It will be apparent to those skilled in the art that various modifications and variations can be made in the instruments and methods of the invention as well as in the construction of this invention without departing from the scope of or spirit of the invention.

The invention has been described in relation to particular examples which are intended in all aspects to be illustrative rather than restrictive. Those skilled in the art will appreciate that many different combinations of hardware, software and firmware will be suitable for practicing the present invention.

Moreover, other implementations of the invention will become apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

What is claimed is:

1. A feature detection apparatus comprising:
    an input unit, wherein the input unit is capable of receiving (i) at least two unconnected area indicator lines for defining in a digital image an area of interest comprising an object feature, where every two adjacent area indicator lines bound at least a portion of the object feature and at least one of every two adjacent area indicator lines intersects the object feature, and (ii) information identifying a parametric shape that approximates a shape of the object feature in the area of interest;
    a parameter range defining unit, wherein the parameter range defining unit is capable of defining ranges of parameter values, using a processor, for each of at least two parameters that define properties of the parametric shape, where the ranges of parameter values for each of the at least two parameters define the parametric shape so that the parametric shape intersects at least one of the area indicator lines;
    a detection unit, wherein the detection unit is capable of detecting object feature pixels in the digital image corresponding to the object feature in the area of interest;
    a parameter selection unit, wherein the parameter selection unit is capable of selecting a combination of values from the ranges of parameter values, using the processor, that provide an approximation of the parametric shape to the object feature in the area of interest, the combination of values selected by calculating a deviation between the parametric shape based on the combination of parameter values and the object feature pixels; and
    an output unit, wherein the output unit is capable of providing the parametric shape based on said combination of values for display in the digital image approximately overlying the object feature.

2. The feature detection apparatus of claim 1 wherein the parameter range defining unit is capable of defining ranges of the parameter values for a plurality of different parametric shapes, for which each of the parametric shapes intersects at least one of the area indicator lines.

3. The feature detection apparatus of claim 1 wherein the parameter selection unit is capable of selecting the combination of values such that the parametric shape constitutes a best fit approximation to the object feature in the area of interest.

4. The feature detection apparatus of claim 1 wherein the parameter range defining unit is capable of defining sub ranges of the at least two parameters for which the parametric shape intersects the at least two area indicator lines.

5. The feature detection apparatus of claim 1 wherein the input unit is capable of receiving at least two indicator points that define end points of one of the at least two area indicator lines.

6. The feature detection apparatus of claim 1 wherein the at least two area indicator lines are based on two indicator points, each of the at least two area indicator lines extending through one of the two indicator points so that the area indicator lines define an essentially rectangular area of interest.

7. The feature detection apparatus claim 1 further comprising:

a filter unit, wherein the filter unit is capable of filtering out from said object feature pixels, using the processor, those object feature pixels exceeding a specific distance to said parametric shape;

a recalculation unit, wherein the recalculation unit is capable of recalculating the approximation to said object feature, using the processor, based on the object feature pixels not including those object feature pixels exceeding the specific distance.

8. The feature detection apparatus of claim 1 wherein the parametric shape based on said combination of values is superimposed on the object feature in the digital image on a display unit, using the processor.

9. The feature detection apparatus of claim 1 wherein the parameter selection unit is capable of selecting another combination of values from the ranges of parameter values, using the processor, for which a second parametric shape constitutes an approximation to a second object feature in the area of interest, and wherein a central line between the two parametric shapes is calculated.

10. An optical instrument comprising the feature detection apparatus according to claim 1.

11. The optical instrument according to claim 10 further comprising a first control element, wherein the first control element is capable of defining on the parametric shape a measurement pixel and converting the measurement pixel into an approximation of coordinates of a position assuming a default distance between the position and the optical instrument.

12. The optical instrument according to claim 11 further comprising:
a lens arrangement, wherein the lens arrangement is capable of sighting the object feature;
a positioning unit, wherein the positioning unit is capable of adjusting the optical axis of the lens arrangement relative to at least one reference axis; and
a second control element, wherein the second control element is capable of instructing the positioning unit, using the processor, to adjust the optical axis of the lens arrangement onto the position to be measured.

13. The optical instrument according to claim 12 further comprising:
a distance measuring unit, wherein the distance measuring unit is capable of measuring a distance to the object feature along a measurement axis of the distance measuring unit parallel to the optical axis of the lens arrangement, wherein
the second control element is capable of instructing the distance measuring unit, using the processor, to measure the distance to the position to be measured, and
the first control element is capable of recalculating the coordinates of the position based on the measured distance.

14. The optical instrument according to claim 12 further comprising a camera aligned with the optical axis of the lens arrangement, wherein the camera is capable of acquiring the digital image of the area of interest.

15. A method of feature detection, the method comprising:
receiving at least two unconnected area indicator lines for defining in a digital image an area of interest comprising an object feature, where every two adjacent area indicator lines bound at least a portion of the object feature and at least one of every two adjacent area indicator lines intersects the object feature;
receiving information identifying a parametric shape that approximates a shape of the object feature in the area of interest;
defining ranges of parameter values for each of at least two parameters that define properties of the parametric shape, where the ranges of parameter values for each for the at least two parameters define the parametric shape so that the parametric shape intersects at least one of the area indicator lines;
detecting object feature pixels in the digital image corresponding to the object feature in the area of interest;
selecting a combination of values from the ranges of parameter values that provide an approximation of the parametric shape to the object feature in the area of interest, the combination of values selected by calculating a deviation between the parametric shape based on the combination of parameter values and the object feature pixels; and
providing the parametric shape based on said combination of values for display in the digital image approximately overlying the object feature.

16. The method of claim 15 further comprising defining ranges of the parameter values for a plurality of different parametric shapes, for which each of the parametric shapes intersects at least one of the area indicator lines.

17. The method of claim 15 further comprising selecting the combination of values such that the parametric shape constitutes a best fit approximation to the object feature in the area of interest.

18. The method of claim 15 further comprising defining sub ranges of the at least two parameters for which the parametric shape intersects the at least two area indicator lines.

19. The method of claim 15 further comprising receiving at least two indicator points that define end points of one of the at least two area indicator lines.

20. The method of claim 15 wherein the at least two area indicator lines are based on two indicator points, each of the at least two area indicator lines extending through one of the two indicator points so that the area indicator lines define an essentially rectangular area of interest.

21. The method of claim 15 wherein the object feature pixels are detected by processing the area of interest using a detection algorithm or by an operator selecting the object feature pixels in the area of interest.

22. The method of claim 15 further comprising:
filtering out from said object feature pixels those object feature pixels exceeding a specific distance to said parametric shape; and
recalculating the approximation to said object feature based on the object feature pixels not including those object feature pixels exceeding the specific distance.

23. The method of claim 15 wherein the parametric shape based on said combination of values is superimposed on the object feature in the digital image on a display unit.

24. The method of claim 15 further comprising:
selecting another combination of values from the ranges of parameter values, for which a second parametric shape constitutes an approximation to a second object feature in the area of interest; and
calculating a central line between the two parametric shapes.

25. The method of claim 15 further comprising
defining on the parametric shape a measurement pixel; and
converting the measurement pixel into an approximation of coordinates of a position assuming a default distance to the position.

26. The method of claim 25, further comprising:
sighting the object feature with a lens arrangement; and
adjusting the optical axis of the lens arrangement onto the position.

27. The method of claim 26 further comprising:
measuring a distance to the position along a measurement axis; and
recalculating the coordinates of the position based on the measured distance.

28. The method of claim 25 further comprising acquiring the digital image of the area of interest.

29. A non-transitory computer readable medium including instructions adapted to cause data processing means to carry out the method of claim 15.

* * * * *